(12) United States Patent
Williams

(10) Patent No.: US 10,326,964 B2
(45) Date of Patent: Jun. 18, 2019

(54) INTERACTIVE BROADCAST TELEVISION

(71) Applicant: Smart Blonde Co., La Canada Flintridge, CA (US)

(72) Inventor: Michael Glenn Williams, La Canada Flintridge, CA (US)

(73) Assignee: SMART BLONDE CO., La Canada Flintridge, CA (US)

( * ) Notice: Subject to any disclaimer, the term of this patent is extended or adjusted under 35 U.S.C. 154(b) by 0 days.

(21) Appl. No.: 14/452,939

(22) Filed: Aug. 6, 2014

(65) Prior Publication Data

US 2016/0044226 A1 Feb. 11, 2016

(51) Int. Cl.
| | |
|---|---|
| *H04N 5/232* | (2006.01) |
| *H04N 7/18* | (2006.01) |
| *H04N 21/2187* | (2011.01) |
| *H04N 21/4788* | (2011.01) |
| *H04N 21/6587* | (2011.01) |
| *H04N 21/81* | (2011.01) |
| *H04N 21/8547* | (2011.01) |
| *H04N 5/222* | (2006.01) |

(52) U.S. Cl.
CPC ............ *H04N 7/181* (2013.01); *H04N 5/222* (2013.01); *H04N 5/23206* (2013.01); *H04N 21/2187* (2013.01); *H04N 21/4788* (2013.01); *H04N 21/6587* (2013.01); *H04N 21/812* (2013.01); *H04N 21/8547* (2013.01)

(58) Field of Classification Search
CPC ...... H04N 7/15; H04N 5/23206; H04N 7/147; H04N 7/181; H04N 5/23203; H04N 21/2187; H04N 5/222; H04N 5/2224; H04N 5/2228

USPC ..... 348/207.99, 211.2, 211.3, 211.8, 211.11, 348/211.12, 239, 722
See application file for complete search history.

(56) References Cited

U.S. PATENT DOCUMENTS

| | | |
|---|---|---|
| 5,526,035 A | 6/1996 | Lappington et al. |
| 6,137,485 A * | 10/2000 | Kawai ...................... H04N 7/15 348/14.03 |
| 6,353,461 B1 | 3/2002 | Shore et al. |
| 6,447,396 B1 | 9/2002 | Galyean et al. |
| 6,737,957 B1 | 5/2004 | Petrovic et al. |
| 7,024,677 B1 * | 4/2006 | Snyder et al. .................. 725/86 |
| 8,132,212 B2 | 3/2012 | Huegel |
| 8,286,218 B2 | 10/2012 | Pizzurro et al. |
| 8,413,206 B1 | 4/2013 | Wyatt et al. |
| 8,490,128 B2 | 7/2013 | Davis et al. |
| 8,516,533 B2 | 8/2013 | Davis et al. |
| 8,528,036 B2 | 9/2013 | Davis et al. |
| 8,739,208 B2 | 5/2014 | Davis et al. |
| 2004/0187148 A1 | 9/2004 | Cassella |
| 2005/0099493 A1 * | 5/2005 | Chew ......................... 348/14.08 |
| 2009/0316671 A1 * | 12/2009 | Rolf ........................ H04W 4/02 370/338 |
| 2009/0319423 A1 | 12/2009 | Kersenbrock |
| 2012/0236160 A1 * | 9/2012 | Rezek et al. ............. 348/207.11 |

(Continued)

*Primary Examiner* — James M Hannett
(74) *Attorney, Agent, or Firm* — Foley & Lardner LLP

(57) ABSTRACT

A system includes a memory and a processor coupled to the memory. The processor receives a video feed from a camera, where the video feed includes video from a filmmaking set. The processor also sends the video feed to a viewer electronic device. The processor also receives a command to control an aspect of the filmmaking set and sends the command to the filmmaking set.

19 Claims, 13 Drawing Sheets

(56) References Cited

U.S. PATENT DOCUMENTS

| | | |
|---|---|---|
| 2014/0068520 A1 | 3/2014 | Missig et al. |
| 2014/0248952 A1* | 9/2014 | Cibula .................. H04W 4/14 |
| | | 463/31 |
| 2016/0012609 A1* | 1/2016 | Laska .................. G06K 9/6267 |
| | | 382/103 |

* cited by examiner

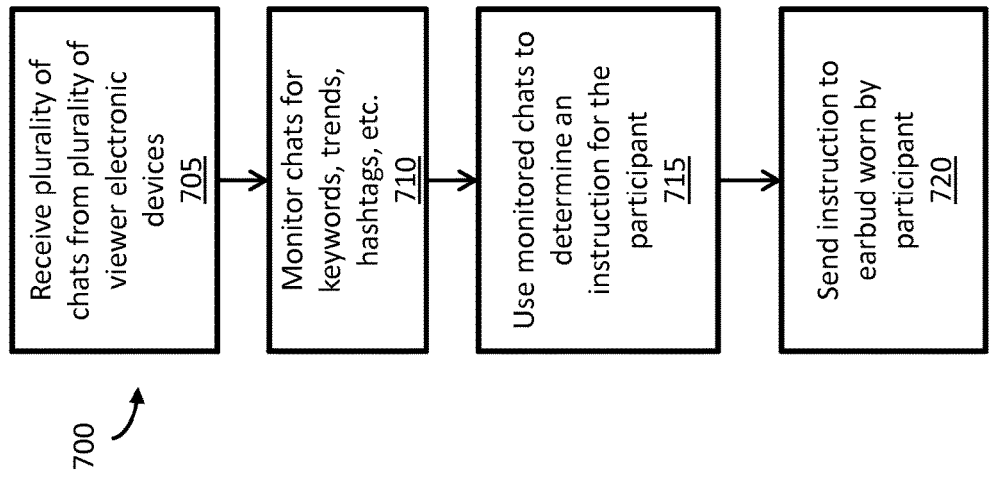
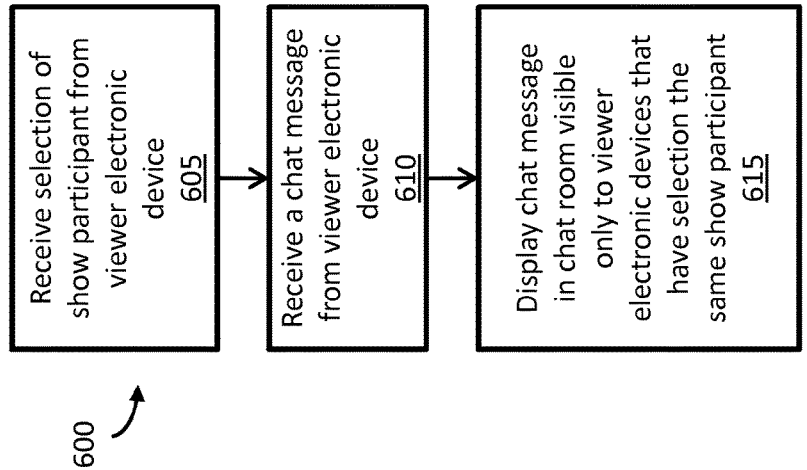

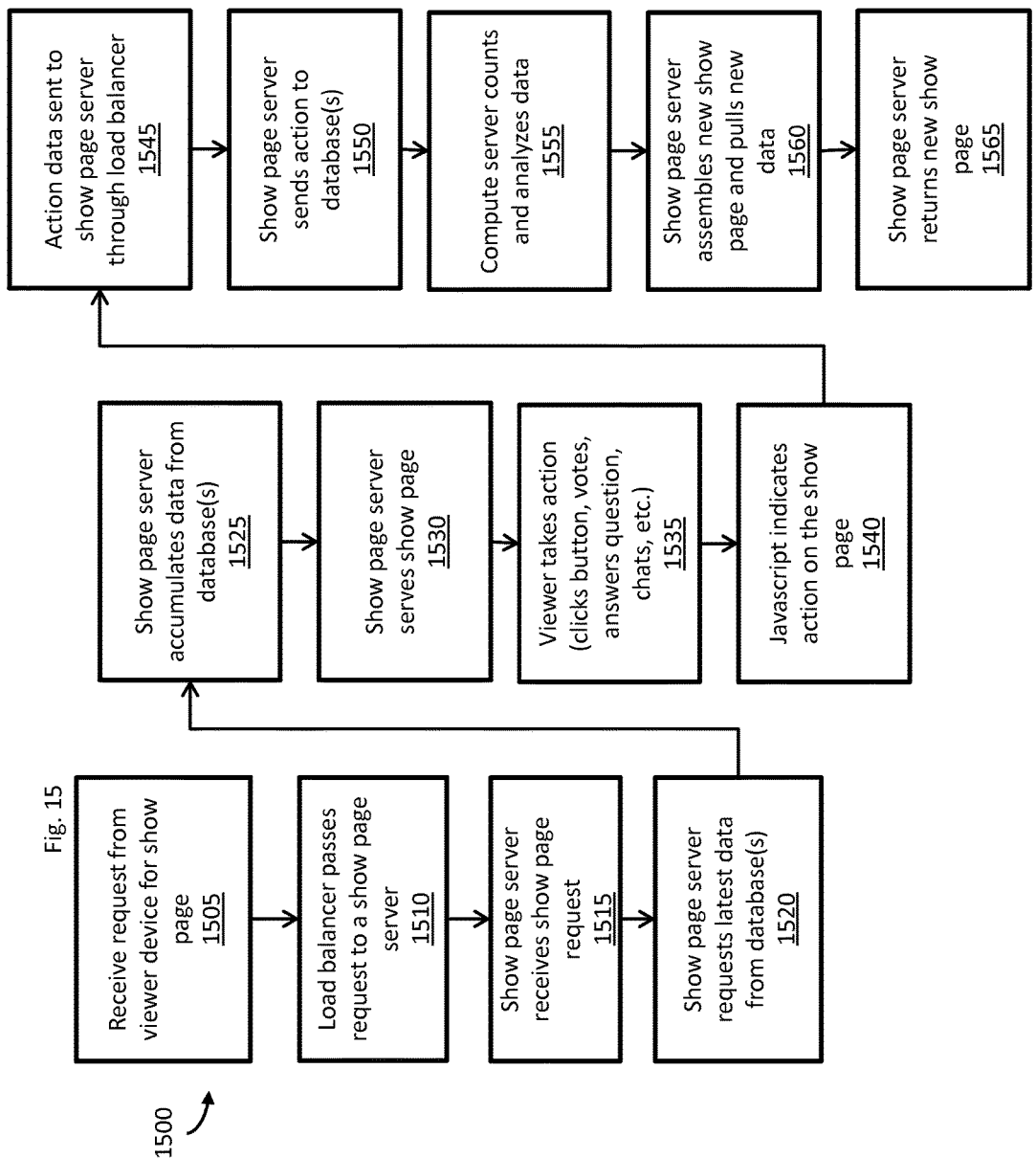

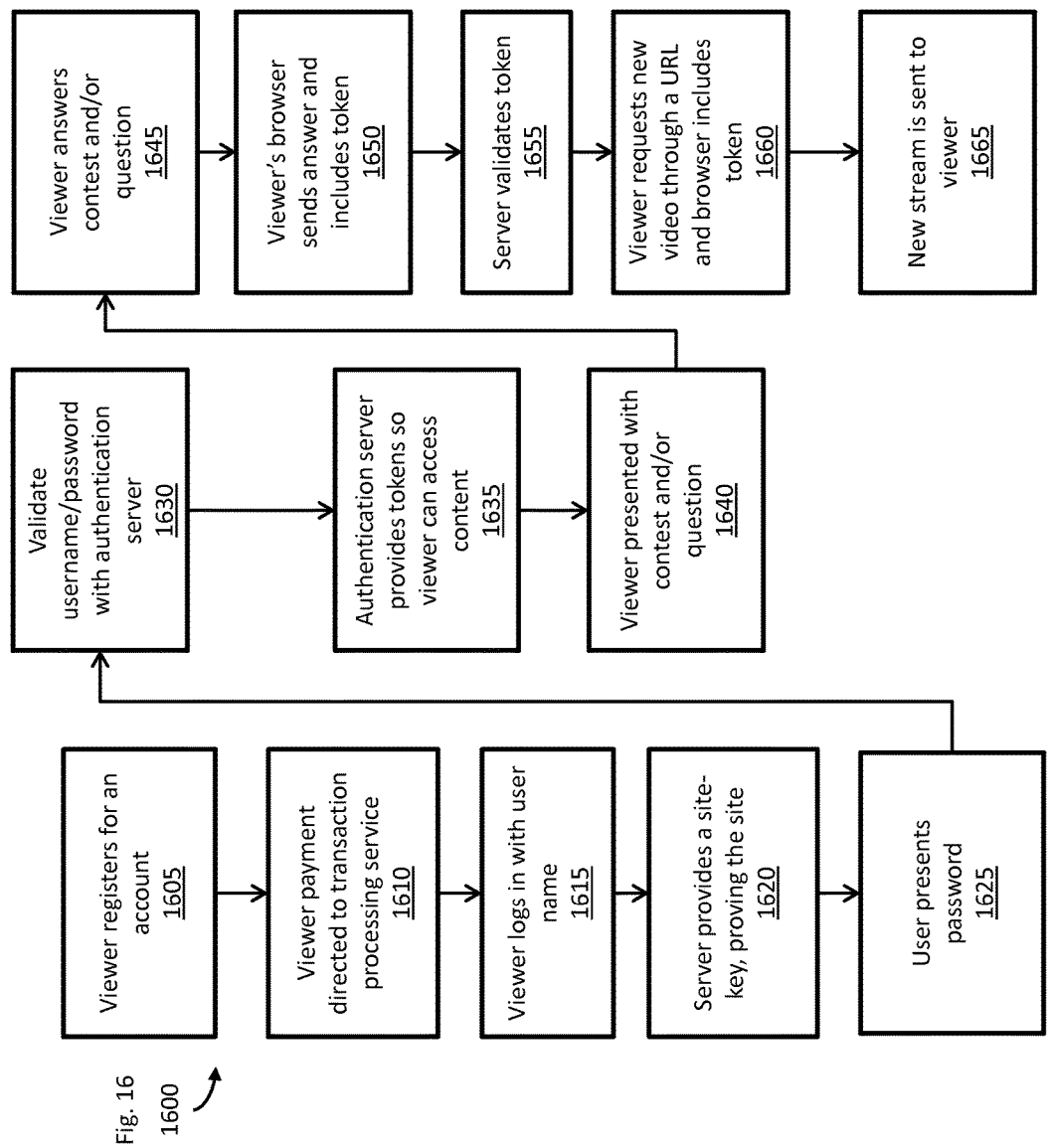

US 10,326,964 B2

INTERACTIVE BROADCAST TELEVISION

BACKGROUND

Television is a popular form of entertainment. Television entertains in many ways. For example, live sporting events may be broadcast on television. Other television programming may include scripted television shows that prerecorded and later broadcast. Some scripted shows are even filmed and broadcast live. Other television programming may include the broadcast of movies or documentaries. Television may be broadcast through radio waves through air. Television may also be broadcast through cable lines or through a satellite or over a computer network like the Internet.

Another type of television programming is known as reality television (TV) shows. A reality TV show often consists of a show that is un-scripted or semi-scripted, and the participants or actors in the show often participate as themselves. That is, they are often not acting as another person for the TV show. Some reality shows include documenting a celebrity or interesting business-owner. Other reality TV shows document several teams of participants racing across a set distance of land, with certain physical challenges incorporated throughout the course. Some reality TV shows force all of the participants in the show to live in a house together, and are put through certain challenges that test their ability to interact with other human beings in a civil manner while the world looks on in amusement.

SUMMARY

A system includes a memory and a processor coupled to the memory. The processor receives a video feed from a camera, where the video feed includes video from a filmmaking set. The processor also sends the video feed to a viewer electronic device. The processor also receives a command to control an aspect of the filmmaking set and sends the command to the filmmaking set.

A method includes receiving, by a processor, a video feed from a camera, where the video feed includes video from a filmmaking set. The method also includes sending, by the processor, the video feed to a viewer electronic device. The method also includes receiving, by the processor, a command to control an aspect of the filmmaking set. The method also includes sending, by the processor, the command to the filmmaking set.

A non-transitory computer readable medium having instructions stored thereon for execution by a processor includes instructions to receive, by the processor, a video feed from a camera, where the video feed comprises video from a filmmaking set. The medium also includes instructions to send, by the processor, the video feed to a viewer electronic device. The medium also includes instructions to receive, by the processor, a command to control an aspect of the filmmaking set. The medium further includes instructions to send, by the processor, the command to the filmmaking set.

BRIEF DESCRIPTION OF THE DRAWINGS

Illustrative embodiments will hereafter be described with reference to the accompanying drawings.

FIG. 6 is a flow diagram illustrating a method for receiving a chat message from a viewer electronic device in accordance with an illustrative embodiment.

FIG. 7 is a flow diagram illustrating a method for monitoring chat messages from viewer electronic devices in accordance with an illustrative embodiment.

FIG. 15 is a flow diagram illustrating a method for displaying an interactive user interface for a show in accordance with an illustrative embodiment.

FIG. 16 is a flow diagram illustrating a method for an authentication procedure for a viewer using a user interface for a show in accordance with an illustrative embodiment.

DETAILED DESCRIPTION

Figure 1:
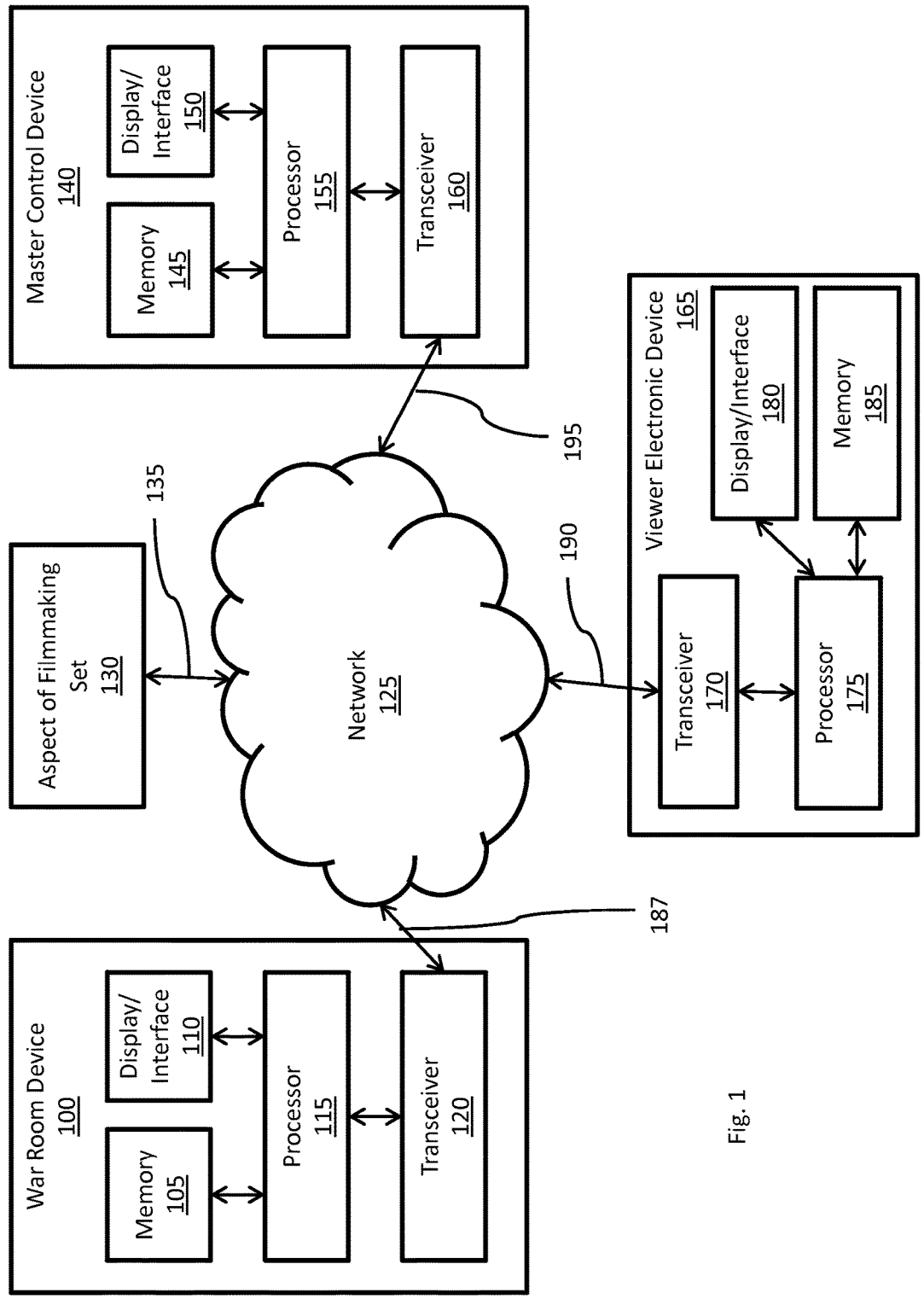
FIG. 1 is a block diagram illustrating computing devices, a war room device, a master control device, a viewer electronic device, and an aspect of a filmmaking set, that may be used in accordance with an illustrative embodiment.

Described herein are illustrative embodiments for methods and systems that provide for an interactive reality television (TV) show. The TV show may be scripted, semi-scripted, or un-scripted. Such a show may allow a viewer of the show to watch the broadcast show on their television, while interacting with the TV show on their computer or smart phone. Additionally, the show may be recorded and broadcast live, allowing a viewer to see their interactions with the show happen while watching the TV show. Such interactions with the show may include using or changing on set cameras, controlling set items such as door locks or lights, or drawing onto the live video feed of the TV show. In another embodiment, the viewer may interact by talking to a participant on the show or talking to an intermediary who communicates messages from viewers to a participant on the show. A viewer may also vote or give advice to a participant in the show, which can be aggregated with the advice and votes of other viewers to determine a piece of advice actually passed on to the participant in the show. In another embodiment, a viewer may have access to multiple cameras on the set of the television show, including cameras that may be worn by participants in the show. For example, a reality show may be filmed in and around a house where several participants live. The viewer may be able to select any camera inside the house to view what is happening at any particular time. A viewer may even be able to select and see camera views even when the show is not currently being broadcast over satellite, cable, internet, etc. In other words, an interactive viewer of the reality television show may have unlimited access to live content regarding the show at all times. The TV show may be broadcast in a number of ways, including satellite, cable, over air radio waves, or streaming through the internet.

A viewer may also be able to draw onto the screen while watching a camera view on their computer. For example, a viewer may want to draw an arrow pointing to something funny happening in the view. The viewer may be able to capture a short video or GIF in order to repost it or link to it elsewhere. Thus, his online "friends" and others may be able to see the funny moment captured by the viewer. When the television show is being broadcast, the drawings may even be incorporated into the broadcast. This may happen live or through a time delay.

A viewer is able to select the music for the show interactively in real time. The music may be either the music only they hear, or it may be the music a group hears such as the group of viewers with the same hero, or for the entire audience of the show. The music is independent from the other sounds, speaking, singing, acting from the participants or other people on the filmmaking set. The system can blend the viewer's music with the other sounds of the show, or suppress the sounds and play only the selected music.

A TV show may also associate participants of the show with a war room. Such a war room may be connected to the participant through audio and/or video connections. For example, a participant may wear an ear bud headphone to hear advice or instruction from the war room operator. A participant may also have a smart phone or other display to see video or other displays sent to the participant by the operator of the war room. The operator of the war room may talk to the participant and send them displays based on advice or voting results received from viewers. The war room operator may also select a particular viewer to interact with the participant or aspects of the set. The war room may also have an automated "operator" that aggregates interactions, advice, chats, and voting from viewers into the most popular suggestions for the participant. The automated operator may automatically send the advice or perform the action, or it may present the aggregated data to a human operator who may decide what to send. A selected viewer may even be involved in a competition on the show that involves the participants. Any interactions by a viewer or the war room operator may also be incorporated into the broadcast of the TV show, live or on a delay. In addition, a viewer may select a particular participant of the show to "follow" or interact with. This participant may be referred to as that viewer's "hero." When a viewer selects a hero, the viewer's electronic device may be connected to content and other viewers that have also selected that participant as a hero. In this way, the war room operator associated with a single participant handles interactions only with viewers that have chosen to make that participant their hero. Furthermore, engagement of viewers may increase because viewers can have further involvement with participants they like the most and have access to further content regarding their hero. Viewers may also be able to interact with other viewers who have selected the same hero. In other embodiments, a war room may not be associated with a single participant. For example, a war room may be associated with a group or team of participants, a group or team of viewers, a group of viewers from a particular location or with a particular common interest, or associated with a particular room or region on a filmmaking set. A war room may also broadcast commands sent to the set, advice given to a participant, or other actions and interactions directly to social media and/or blog web sites. For example, if a war room, either through the instruction of a viewer or not, instructs a participant to walk across hot coals, a tweet and/or status update may be broadcast to social media and/or blog web sites indicating that the participant walked over hot coals. A picture, screenshot, video, and reactions from fans and viewers may be included with the broadcast. The broadcasts to social media may be made in real or near-real time.

Viewers may also have accounts associated with one or more interactive TV shows. Viewers may receive rewards for participating in a show and performing other actions. For example, a viewer may receive rewards for voting on a question posed by the show's producers or a war room operator. A viewer may also get rewards for chatting about the show, posting something about the show on social media, playing a game related to the show or on the show's website, or several other ways. A viewer may also get rewards based on the performance of their preferred participant or team of participants on the show. The rewards may be cumulative, so that they can be used to rank a viewer relative to other viewers. In this way, viewers can compete with each other, and by incentivizing engagement with and about the show, viewers may be more likely to spend more time on the show website, engage others in the show, and be susceptible to advertising shown on the show itself and displayed on the show's website. The rewards may also be redeemed by viewers. For example, rewards may be used to unlock content or additional features related to the show. The rewards may be used to purchase real life items that can be delivered to a viewer's home. Rewards may also be redeemed to allow the viewer to interact with the TV show or prioritize their requested interactions. In other words, by accruing more awards and being more engaged with the show, a viewer may be more likely to be selected to interact with the show and/or be selected to be incorporated into a broadcast of the show. Although rewards may be redeemed to acquire read goods or services, viewers may also be able to purchase goods and services through the show website as well.

Viewers can purchase items they see on the show immediately. The system enables the viewer to recognize which items visible on the show are for sale, by highlighting them in some way. For example, a graphic may appear on the screen. Such a graphic may outline the item seen on the show. Another example may be an arrow or other indicator that draws the viewer's attention to the item seen on the show that is available for purchase. The viewer may select them via touch or click on them to initiate a purchase without disrupting the show.

The present disclosure is directed to a method, system, and computer-readable medium for an interactive television show. Advantages of such a show may include making television programming more profitable. If making a show interactive increases viewership of the show, advertisements that run during the show can be sold for more money, increasing profitability. Furthermore, if viewers interact with the show on the show's website, advertising for the website can also be sold. Because items advertised or placed in the show can be for purchase immediately, the show may be uninterrupted by commercials. Furthermore, content related to the show may also be sold through the website to generate additional revenue based on the show's popularity. As noted above, even features for interacting with the show, including but not limited to, drawing tools and images for applying to the show, may be sold to viewers. Additionally such a show has advantages because viewers may feel better connected to the show and its participants and other viewers. The rewards account and successfully interacting with the set or a participant may advantageously give a viewer a sense of accomplishment. Furthermore, viewers may follow a particular hero, making them emotionally invested in the hero's performance. Allowing viewers to interact with each other generally or with other viewers who have selected the same hero may also help build a community around the show and increase engagement and viewership regarding the show. Also, by having viewers create logins and rewards accounts, some personal information may be acquired about the viewers, allowing advertisers to better tailor advertisements to the target audience. Furthermore, a viewer account may allow a viewer to participate in multiple shows with the same login. This helps a viewer have more convenient interactions with multiple shows and may allow a viewer to maintain a common rewards account that is utilized over multiple shows. Advantageously, the chance to appear or have an interaction appear on the TV show broadcast may also get many viewers to engage in the show. Such viewers may be seeking their moment of fame and notoriety, and may see the show disclosed herein as such an opportunity. Viewers may also enjoy a chance for a one-on-one connection with the participant of a show.

Show producers can use the personal information about the viewer, and the immediate feedback from the viewer to modify the show in real time, or to choose a future direction for the show. The producers may also pose personalized questions to the viewers and get personal responses directly, including asking for new ideas for aspects of the show. This eliminates the need for analyzing Twitter or FaceBook or other social networks to determine viewer's opinions, as the viewer is directly communicating with the show.

It should be understood that the phrase "filmmaking set" is not meant to be limiting; it is meant to encompass many locations or areas, unless otherwise noted. The filmmaking set as used herein is meant to describe anywhere that a film may be made. Thus, any location where a camera or microphone is present may be characterized as a filmmaking set, even if the camera or microphone is not filming or recording all the time. Additionally, although a camera may technically not be in every location of a filmmaking set, a camera and/or microphone can necessarily record what is around the camera and/or microphone. Thus, it should be understood that the filmmaking set is not limited to the exact placement of a camera or microphone, but may include any area around a camera and/or microphone. Similarly, if a camera and/or microphone are taken to a location, that location may be characterized as a filmmaking set as defined herein. Thus, a public place like a park, that may not typically be considered a filmmaking set, may be a filmmaking set as defined herein due to the presence of a camera or microphone.

A camera as disclosed herein may be any type of camera or camera/microphone/speaker combination. For example, a camera may be a smartphone equipped with a camera, a digital camera, a film camera, a wearable camera, a hidden camera, a video camera, a night vision camera, an infrared (IR) camera, a roving camera, a fixed camera, a hidden camera, a manned camera, or a remotely controlled camera, a motion activated camera (camera only records images when motion or changes in light are present in the view of the lense), a still image camera, or cameras with various types of lenses (high zoom, underwater, panoramic, etc.).

In an illustrative embodiment, the system can synchronize multiple live streams or feeds of audio and video. For example, multiple streams or feeds from a filmmaking set may be used to broadcast a live television program. Additionally, live video and audio streams or feeds from multiple viewer electronic devices may also be used in the broadcast of a live television program. All of the streams or feeds can be synchronized in order to broadcast a live (or near live) television program that gleans content from a filmmaking set, editing devices, and viewer generated content from viewer devices, all available live and capable of being synchronized for the live television broadcast.

In an illustrative embodiment, the system may also be equipped with body or facial recognition. The body or facial recognition may be used to automatically edit footage. For example, if no body or face is recognized in front of a camera, that footage may not be broadcast In a live stream. In another embodiment, a live stream may seek to broadcast images of a particular participant continually. As that participant moves throughout a filmmaking set, the system may automatically identify their face and/or body in order to cut to whichever camera has a view of the participant. In another embodiment, the facial or body recognition can be used to comply with regulatory concerns. For example, if a camera senses a large proportion of exposed skin on a body, the system may either obscure that skin in the feed from that camera or stop the feed from that camera altogether until the exposed skin ceases to be present or until the footage can be checked by a system operator to determine whether the images from the camera comply with regulatory modesty concerns. In another embodiment, a participant may take advantage of facial recognition along with speech to text capabilities to automatically pose a question to their followers without the involvement of a war room operator or other staff person off the filmmaking set. For example, a participant may go to a camera that they know can see a good view of their face. The participant can speak while looking into the camera. For example, the participant may say: "Hello followers. I need to know whether I should wear shorts, pants, or a Greek toga today." The speech recognition can recognize the question and the possible answers posed by the participant. The facial recognition can recognize the participant posing the question. With that information, the system can automatically pose the question and possible answers to the viewers who have chosen the participant as their hero. The viewers may then also be able to vote for their preferred answer choice through a user interface, such as one discussed below with respect to FIG. 13. Facial recognition may also be used by a viewer to draw objects or lines onto a display. For example, if a viewer would like to add a mustache to a participants face, the system may automatically track the position of the participant's face and keep the mustache on the participant's face even if the participant moves. In another embodiment, an object recognition may be used similar to facial recognition. For example, if there is an important object on the filmmaking set, such as a treasure chest, the object recognition may recognize the treasure chest so that the object can be followed even if it is moved around the filmmaking set. That is, the system can recognize the treasure chest from a certain camera feed and automatically select that camera feed can be used in a stream that is following the object. If the object is moved out of that camera's view, the system can recognize the object appearing on a second camera feed, allowing the system to then select the second camera feed for the stream that is following the object.

In another illustrative embodiment, additional games or contests may be occurring for viewers outside of the context of the show the participants are involved in. For example, a puzzle or riddle may be orchestrated for viewers where they must find clues throughout the filmmaking set in order to piece together the answer to the clues. By solving a riddle or puzzle, the viewer may earn reward points, unlock achievements, or receive virtual or real items through the show website. In another embodiment, the viewer may be able to look for clues or things around the filmmaking set that may help their hero or selected participant. For example, in a survival based reality show, the viewer may help the participant search for food, water, or tools that may be helpful to survive.

FIG. 1 is a block diagram illustrating computing devices, a war room device 100, a master control device 140, a viewer electronic device 165, and an aspect of a filmmaking set 130, that may be used in accordance with an illustrative embodiment. In alternative embodiments, fewer, additional, and/or different components may be included in the system. FIG. 1 also includes a network 125. The war room device 100 includes a processor 115 that is coupled to a memory 105. The processor 115 can store and recall data and applications in the memory 105. The memory 105 may be a separate server located physically away from the rest of the war room device 100. In another embodiment, the memory 105 may be physically integrated into the war room device 100. The processor 115 may also display objects, applications, data, etc. on a display/interface 110. The display/interface 110 may be a touchscreen, a game system controller, a remote control, a keyboard, a mouse, a trackpad, a microphone, a camera, a set of buttons, a standard electronic display screen, a television, a computer monitor, or any combination of those or similar components. The processor 115 may also receive inputs from a viewer through the display/interface 110. The processor 115 is also coupled to a transceiver 120. With this configuration, the processor 115, and subsequently the war room device 100, can communicate with other devices, such as the master control device 140 through a connection 187 and the network 125. In an illustrative embodiment, the war room device 100 may be used to control any commands that are sent to the aspect of the filmmaking set 130. In one embodiment, the commands may be sent from war room device 100. In another embodiment, the war room device 100 may automatically or manually select a viewer electronic device 165 to send commands to the aspect of the filmmaking set 130. Although FIG. 1 shows one war room device 100, an alternative embodiment may include multiple war room devices. For example, as discussed above, there may be several war room devices, one for each of the participants in the show that exist on or inhabit the filmmaking set. In another embodiment, there may be a war room device 100 for each team of participants in the show.

The master control device 140 includes a processor 155 that is coupled to a memory 145. The processor 155 can store and recall data and applications in the memory 145. The memory 145 may be a separate server located physically away from the rest of the master control device 140. In another embodiment, the memory 145 may be physically integrated into the master control device 140. The processor 155 may also display objects, applications, data, etc. on a display/interface 150. The display/interface 150 may be a touchscreen, a keyboard, a game system controller, a remote control, a mouse, a trackpad, a microphone, a camera, a set of buttons, a standard electronic display screen, a television, a computer monitor, or any combination of those or similar components. The processor 155 may also receive inputs from a viewer through the display/interface 150. The processor 155 is also coupled to a transceiver 160. With this configuration, the processor 155, and subsequently the master control device 140, can communicate with other devices, such as the war room device 100 through a connection 195 and the network 125. In an illustrative embodiment, the master control device 140 may be used to control what is used from the war room device 100, the filmmaking set, and various viewer electronic devices 165 to broadcast the television show. In an alternative embodiment, there may be multiple master control devices that make different shows based on content derived from the same war room devices, viewer electronic devices, and aspects of the filmmaking set.

The viewer electronic device 165 includes a processor 175 that is coupled to a memory 185. The processor 175 can store and recall data and applications in the memory 185. The memory 185 may be a separate server located physically away from the rest of the viewer electronic device 165. In another embodiment, the memory 185 may be physically integrated into the viewer electronic device 165. The processor 175 may also display objects, applications, data, etc. on a display/interface 180. The display/interface 180 may be a touchscreen, a game system controller, a keyboard, a remote control, a mouse, a trackpad, a microphone, a camera, a set of buttons, a standard electronic display screen, a television, a computer monitor, or any combination of those or similar components. The processor 175 may also receive inputs from a viewer through the display/interface 180. The processor 175 is also coupled to a transceiver 170. With this configuration, the processor 175, and subsequently the viewer electronic device 165, can communicate with other devices, such as the war room device 100 through a connection 190 and the network 125. Although FIG. 1 shows only one viewer electronic device 165, an alternative embodiment may include multiple viewer electronic devices. The multiple viewer electronic devices may be able to communicate with each other, for example through a chat room. The chat room may be administrated by the war room device 100 or a server associated with the war room device 100. In another embodiment, the war room device 100 may sort and filter communications, interactions, and commands from multiple viewer electronic devices, allowing the war room device to automatically generate messages or commands based on the sorted and filtered data from the viewer electronic devices. A war room device operator may also set rules on how data relating to actions of viewer electronic devices should be analyzed, aggregated, and filtered.

FIG. 1 also includes the aspect of the filmmaking set 130. In an illustrative embodiment, the aspect of the filmmaking set is a camera. The camera can receive commands from any of the war room device 100, the viewer electronic device 165, or the master control device 140 through a connection 135 and the network 125. For example, the camera may receive a command to move or rotate to change the view that the camera lens is pointing toward. The camera could also receive a command to zoom in or out or may receive a command to focus in or out. A camera may also receive other various commands, such as a command to move if a camera is equipped with the ability to move around the filmmaking set. A camera may also receive a command to turn on a light on the camera to indicate that it is actively recording or broadcasting to any of the other devices. In various other alternative embodiments, the aspect of the filmmaking set 130, may be other devices and controls for aspects of the set, many of which are disclosed herein. In this embodiment, the aspect of the filmmaking set may receive controls from the viewer electronic device 165 by way of the war room device 100, and the results of the command may be used by the master control device 140 as part of a broadcast show. For example, if a viewer electronic device 165 sends a command that requests the activation of the camera view in the great room of a house on the filmmaking set, the war room device 100 may grant that request by activating the camera in the great room. The master control device 140 may receive a notification that the camera in the great room has been activated, and may choose to include the footage from the camera in the great room in a broadcast of the television show.

The devices shown in the illustrative embodiment may be utilized in various ways. For example, any of the connections 187, 190, 195, and 135 may be varied. Any of the connections 187, 190, 195, and 135 may be a hard wired connection. A hard wired connection may involve connecting the devices through a USB (universal serial bus) port, serial port, parallel port, or other type of wired connection that can facilitate the transfer of data and information between a processor of a device and a second processor of a second device, such as between the war room device 100 and the master control device 140. In another embodiment, any of the connections 187, 190, 195, and 135 may be a dock where one device may plug into another device. While plugged into a dock, the client-device may also have its batteries charged or otherwise be serviced. In other embodiments, any of the connections 187, 190, 195, and 135 may be a wireless connection. These connections may take the form of any sort of wireless connection, including but not limited to Bluetooth connectivity, Wi-Fi connectivity, or another wireless protocol. Other possible modes of wireless communication may include near-field communications, such as passive radio-frequency identification (RFID) and active (RFID) technologies. RFID and similar near-field communications may allow the various devices to communicate in short range when they are placed proximate to one another. In an embodiment using near field communication, two devices may have to physically (or very nearly) come into contact, and one or both of the devices may sense various data such as acceleration, position, orientation, velocity, change in velocity, IP address, and other sensor data. The system can then use the various sensor data to confirm a transmission of data over the internet between the two devices. In yet another embodiment, the devices may connect through an internet (or other network) connection. That is, any of the connections 187, 190, 195, and 135 may represent several different computing devices and network components that allow the various devices to communicate through the internet, either through a hard-wired or wireless connection. Any of the connections 187, 190, 195, and 135 may also be a combination of several modes of connection. The network 125 may also include similar components described above with respect to the connections 187, 190, 195, and 135. In addition, the network 125 may include intermediate servers, routing devices, processors, data traffic management services, and wired or un-wired connections.

To operate different embodiments of the system or programs disclosed herein, the various devices may communicate in different ways. For example, the war room device 100, master control device 140, and viewer electronic device 165 may download various software applications from a server through the internet. Other software applications may be manually installed on the devices. Such software applications may allow the various devices in FIG. 1 to perform some or all of the processes and functions described herein. Additionally, the embodiments disclosed herein are not limited to being performed only on the disclosed devices in FIG. 1. It will be appreciated that many various combinations of computing devices may execute the methods and systems disclosed herein. Examples of such computing devices may include smart phones, personal computers, servers, laptop computers, tablets, blackberries, RFID enabled devices, video game console systems, smart TV devices, or any combinations of these or similar devices.

In one embodiment, a download of a program to the viewer electronic device involves the processor 175 receiving data through the transceiver 170 through connection 190 and the server. The network 125 may be connected to the internet. The processor 175 may store the data (like the program) in the memory 185. The processor 175 can execute the program at any time. In another embodiment, some aspects of a program may not be downloaded to the viewer electronic device 165. For example, the program may be an application that accesses additional data or resources located in a server, such as one incorporated in the memory 105 of the war room device 100. In another example, the program may be an internet-based application, where the program is executed by a web browser and stored in a server that is part of the network 125 or the war room device 100. In the latter example, temporary files and/or a web browser may be used on the viewer electronic device 165 in order to execute the program, system, application, etc. In additional embodiments, the master control device 140 and the war room device 100 may use, store, or download software applications and web based programs in a similar way.

The configuration of the war room device 100, the master control device 140, the viewer electronic device 165, and the aspect of the filmmaking set 130 is merely one physical system on which the disclosed embodiments may be executed. Other configurations of the devices shown may exist to practice the disclosed embodiments. Further, configurations of additional or fewer devices than the ones shown in FIG. 1 may exist to practice the disclosed embodiments. Additionally, the devices shown in FIG. 1 may be combined to allow for fewer devices or separated where more than the four devices shown exist in a system.

Figure 2:
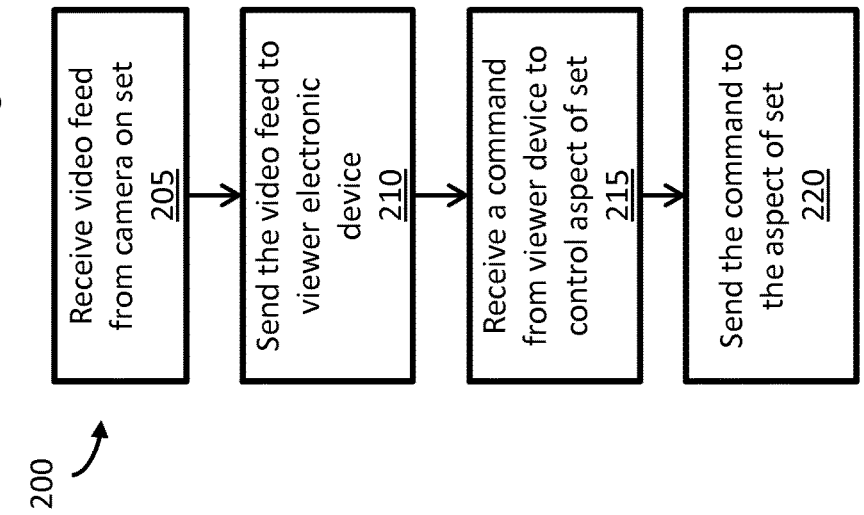
FIG. 2 is a flow diagram illustrating a method for controlling an aspect of a filmmaking set in accordance with an illustrative embodiment.

FIG. 2 is a flow diagram illustrating a method 200 for controlling an aspect of a filmmaking set in accordance with an illustrative embodiment. In alternative embodiments, fewer, additional, and/or different operations may be performed. Also, the use of a flow diagram is not meant to be limiting with respect to the order of operations performed. In an operation 205, a video feed is received from a camera on a filmmaking set. In an illustrative embodiment, the camera may be an aspect of the filmmaking set 130 as discussed above with respect to FIG. 1. In various alternative embodiments, the camera may be a video camera, a night vision camera, an infrared (IR) camera, a roving camera, a fixed camera, a hidden camera, a manned camera, or a remotely controlled camera. The video feed may be received by a computing device, such as the war room device 100 discussed with respect to FIG. 1 above. In an operation 210, the video feed is sent to a viewer electronic device. In an illustrative embodiment, this allows a viewer to see what is happening on the set of the show by using their own electronic device. In an operation 215, the a command from the viewer device is received to control an aspect of the filmmaking set. In an operation 220, the command from the viewer device is sent to the aspect of the filmmaking set. In an illustrative embodiment, the aspect of the of the filmmaking set is a video camera. In this embodiment, the command is a command to control the camera. For example, the command may be a command to turn the camera lens to the right, so that a different picture can be recorded or broadcast by the camera. In other embodiments, the command may be to adjust the focus of the camera; take a snapshot with the camera; zoom in or out; angle the view of the camera up, down, left, or right; move the physical position of the camera if it can be remotely moved; or command the camera to stop recording or broadcasting a video signal. In other embodiments, the command to control the aspect of the filmmaking set may come from other devices, such as the war room device or the master control device that are discussed above with respect to FIG. 1.

In an alternative embodiment, the aspect of the filmmaking set may be a speaker. In this embodiment, the command sent to the speaker may be an audio signal that is played audibly for participants on set to hear or feel. For example, the audio signal may be a prerecorded voice message, a song, a live voice message, a sound effect, a radio station signal, morse code, or a signal meant to cause a vibration that can be felt. The command may also be a signal to adjust the speaker. For example, the command may cause the speaker to raise or lower in volume. The command may also be to rotate or otherwise change where the speaker points. Further, the command may be to physically move the speaker to another location on the filmmaking set. The command may also be to activate or deactivate the speaker on the set. In this way, a viewer device The aspect of the filmmaking set may also be a microphone. The command may activate the microphone, adjust the sensitivity of the microphone, adjust where the microphone is pointing, or physically change the location of the microphone on the filmmaking set.

In another embodiment, the aspect of the filmmaking set may be an image display. For example, an image display may be a television screen, the screen of a smart phone or tablet, a projector, or other similar image display. The command sent to image display may be a video. For example, a viewer may activate a camera on their viewer electronic device, which could send a video signal to the image display on the filmmaking set. In this way, someone on the filmmaking set may be able to see a viewer. A command may also be activating an image display, that is, turning it on. Similarly, the command may be turning off an image display. A command may also be to send a movie, television show, or other prerecorded video signal to the image display. Further, the command may be to adjust a brightness, color, or contrast of an image display. The command may also be to physically move the image display to a different location on the filmmaking set. In the case of a projector as the image display, the command may be to project an image in a different direction than the projector originally pointed.

In another embodiment, the aspect of the filmmaking set may be a door. In this embodiment, the command may cause a door to open or close on the filmmaking set. The door may be fitted with a motor that can be controlled by the command. The door may be a door that pivots on hinges, a sliding door, a dual closet door, a garage door, a screen door, a doggy door, a cabinet door, the door or top of a chest, or other door. Similarly, the aspect of the filmmaking set could be a window. The window could be controlled to open or close. Additionally, a window covering such as blinds, curtains, or drapes could be controlled by the command. For example, blinds may be closed or opened to reduce or allow more light into a room on the filmmaking set. In another embodiment, the aspect of the filmmaking set may be a lock. In this embodiment, the lock could be made to be locked or unlocked by the command. Such a lock could secure many different things. For example, a lock may be used to lock a door and restrict access to a building, room, or closet on the filmmaking set. A lock on a door may also be commanded to in order to lock someone or something into a room, building, or closet on the filmmaking set. A lock may also be used to lock a cabinet door and restrict or allow access to the contents of the cabinet.

In another embodiment, the aspect of the filmmaking set may be a thermostat. In this embodiment, the command may adjust a temperature a thermostat is set at. In this way, the command may cause a heating/cooling system to make a room or building on the filmmaking set warmer or cooler. Alternatively, instead of adjusting a temperature setting, the command may also directly control a heating furnace or an air conditioning unit. In another embodiment, the command may turn on/off or adjust an automatic fireplace or furnace, for example a gas fireplace. In another embodiment, the command may turn on/off or adjust an electric fan.

In another embodiment, the aspect of the filmmaking set may be an appliance. For example, the appliance may be a dishwashing machine, a microwave, a clothes washing machine, a clothes dryer, a refrigerator, a freezer, a water softener, a beverage dispenser, an ice maker, an electric shaver or clippers, a hair dryer, a curling iron, or a hair straightener. The command may turn on/off or adjust the appliance. In an alternative embodiment, the command may control electric power to a certain place. For example, instead of controlling a hair dryer or curling iron, the command may instead turn off electric power that is supplied to wall outlets in a bathroom of a building on the filmmaking set.

In another embodiment, other utilities may be controlled by the command. For example, a command may turn on/off or adjust water flow to certain parts, or all of, a building on the filmmaking set. As mentioned above, power may also be affected by the command, either locally or universally within a building on the filmmaking set. Similarly, in another embodiment, lights may be controlled by the command by turning on/off or adjusting power of certain electrical circuits that control lighting on the filmmaking set.

In further embodiments, the aspect of the filmmaking set may be a clock, a telephone, a doorbell, or a movable robot. For example, the command may change the time on a clock or set a particular alarm time on the clock. In another example, the command may cause a doorbell to be rung. In another example, the command may cause a telephone to ring. In one embodiment, the command may actually be placing a call to the telephone on the filmmaking set, allowing the caller, such as a war room operator or viewer, to talk to whoever answers the telephone. In another embodiment, the command only causes the phone to ring, and no call is connected if someone on the filmmaking set answers the telephone. In another embodiment, the command may cause a movable robot to move in the filmmaking set. Such a command may be used to achieve various purposes. For example, the movable robot may be used to deliver a message, drink, food, flower, clothes, or toiletries to a participant on the filmmaking set. A movable robot may also have a camera attached to it, allowing a war room operator or viewer to control where the camera films throughout the filmmaking set.

Figure 3:
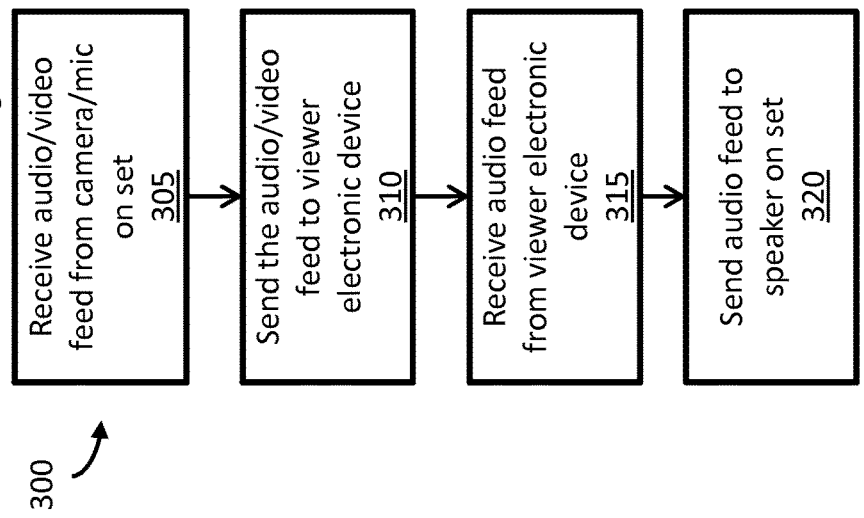
FIG. 3 is a flow diagram illustrating a method for sending a video feed from a filmmaking set to a viewer electronic device in accordance with an illustrative embodiment.

FIG. 3 is a flow diagram illustrating a method 300 for sending a video feed from a filmmaking set to a viewer electronic device in accordance with an illustrative embodiment. In alternative embodiments, fewer, additional, and/or different operations may be performed. Also, the use of a flow diagram is not meant to be limiting with respect to the order of operations performed. In an operation 305, a video and audio feed is received from a camera and microphone on a filmmaking set. In an operation 310, the video and audio feed is sent to a viewer electronic device. In an operation 315, audio feed is received from a viewer electronic device. In an operation 320, the audio feed from the viewer electronic device is sent to a speaker on the set. In this embodiment, a device, for example the war room device 100 of FIG. 1, receives audio and video from a camera and microphone in the filmmaking set. The audio and video can then be sent to one or more viewer electronic devices. In alternative embodiments, the audio and video from the filmmaking set may not be routed through a war room device. The audio and video could be routed through a server, or through the master control device 140 of FIG. 1. In another embodiment, the audio and video from the filmmaking device may be made directly available to the viewer electronic device, for example through the network 125 of FIG. 1. Using the method 300, a viewer electronic device can communicate to a participant or other individual that is on the filmmaking set.

Figure 4:
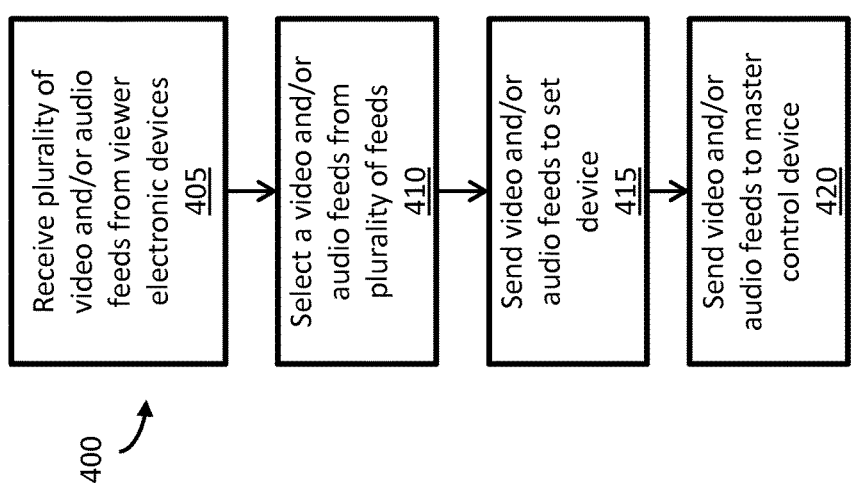
FIG. 4 is a flow diagram illustrating a method for sending a video feed to a master control device in accordance with an illustrative embodiment.

FIG. 4 is a flow diagram illustrating a method 400 for sending a video feed to a master control device in accordance with an illustrative embodiment. In alternative embodiments, fewer, additional, and/or different operations may be performed. Also, the use of a flow diagram is not meant to be limiting with respect to the order of operations performed. In an operation 405, a plurality of video and/or audio feeds are received from a plurality of viewer electronic devices. For example, a viewer with a laptop equipped with a web camera and a microphone may be able to send a video or audio feed, or both, to the war room device 100 as shown in FIG. 1. In an operation 410, a video and/or audio feed is selected from the plurality of feeds. The video and/or audio feed is selected by an operator of the war room device 100 as shown in FIG. 1. In other embodiments, the video and/or audio feed may be selected automatically by the war room device, based on predetermined criteria, such as rewards points possessed by a viewer account or a predetermined schedule for selected viewers that are preselected by the war room operator. In another embodiment, the video and/or audio feed may be voted on or nominated by other viewers. In this way, a selected video and/or audio feed may best represent the views or ideas of many viewers.

In an operation 415, the selected video and/or audio feed is sent to a device on a filmmaking set, such as a television or computer. In this way, the selected feeds, are sent to a participant or participants on the filmmaking set. Accordingly, the selected viewer electronic device that the feeds are coming from can communicate with or to the participant or participants on the filmmaking set that are near enough to the device on the filmmaking set to hear or see the feeds. In an alternative embodiment, the feeds may be sent to a plurality of devices throughout the filmmaking set. In this way, the feed may communicate to all or several participants at the filmmaking set. In an operation 420, the selected video and/or audio feeds are sent to a master control device, such as the master control device 140 in FIG. 1. In one embodiment, the video and/or audio feeds that are sent to the master control device can be used in the production of a television show that is broadcasted. In other words, if the producer's want to include a conversation between a participant on the show and a viewer, the feeds can be sent to the master control device so that the video and/or audio can be included in the broadcast show, which may either be live, near-live, or delayed.

In another alternative embodiment, the selected audio and/or video feeds may also be sent to other viewer electronic devices. In this way, a viewer that is not selected but is participating in the show via a website on their electronic device can be aware of what is happening on the show. In another alternative embodiment, an video and/or audio feed from a viewer electronic device may not be selected to interact with participants on the filmmaking set, but may nevertheless be sent to the master control device or other viewer electronic devices. In these embodiments, a viewer may communicate with other viewers directly, or a viewer feed may be used in the broadcast even if they are not selected to interact directly with participants on the filmmaking set.

Figure 5:
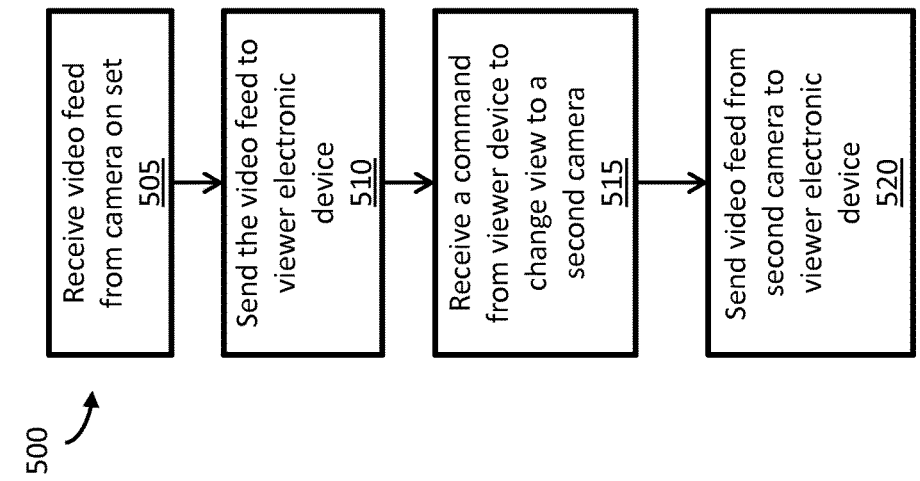
FIG. 5 is a flow diagram illustrating a method for receiving a command from a viewer electronic device to change a view to a second camera in accordance with an illustrative embodiment.

FIG. 5 is a flow diagram illustrating a method 500 for receiving a command from a viewer electronic device to change a view to a second camera in accordance with an illustrative embodiment. In alternative embodiments, fewer, additional, and/or different operations may be performed. Also, the use of a flow diagram is not meant to be limiting with respect to the order of operations performed. In an operation 505, a video feed is received from a camera on a filmmaking set. In an operation 510, the video feed is sent to a viewer electronic device. In an operation 515, a command is received to change a view to a second camera. In this embodiment, a viewer is requesting to change the camera view that is being sent to their viewer electronic device.

In an operation 520, a video feed from the second camera is sent to the viewer electronic device. In one embodiment, the command may include a specification of what room the viewer would like to see. For example, if the viewer is currently looking at the living room of a house on the filmmaking set, a participant may walk from the living room to the kitchen. As a result, the viewer may send a command to change camera views to a camera in the kitchen. Accordingly, a video feed from a camera in the kitchen is then sent to the viewer electronic device. In alternative embodiments, similar commands may be sent with regard to other cameras and microphones throughout the filmmaking set. In one embodiment, microphones may be associated with particular cameras, so that when a viewer sends a command to change cameras, the audio feed sent to the viewer device is also changed to the audio feed associated with the selected camera. Thus, the viewer may switch camera and microphone feeds by only sending one command.

FIG. 6 is a flow diagram illustrating a method 600 for receiving a chat message from a viewer electronic device in accordance with an illustrative embodiment. In alternative embodiments, fewer, additional, and/or different operations may be performed. Also, the use of a flow diagram is not meant to be limiting with respect to the order of operations performed. In an operation 605, a selection of a show participant is received from a viewer electronic device. In other words, a viewer selects a hero, or a show participant they have a positive or negative affinity toward. In an alternative embodiment, a viewer selects a team of participants instead of an individual participant. In another alternative embodiment, a viewer might select a particular location, such as an area, a building, or a room in a building, to follow or have an affinity for. In this embodiment, a viewer may only have access to cameras or other features of the show that relate to that area, building, or room. In an operation 610, a chat message is received from the viewer electronic device.

In an operation 615, the chat message is displayed in a chat room visible only to viewer electronic devices that have selected the same participant as a hero. In an alternative embodiment, chat messages sent by a viewer electronic device may be viewed by all viewers. In another embodiment, participants may be allied or be arranged in teams. In this embodiment, chat messages from viewers whose heroes are on the same team or who are allies may be viewed by each other. In alternative embodiment, the chat messages are actually sent to viewers that have selected the particular hero or team, rather than just displayed in a chat room visible to the viewers. In other embodiments, a different presentation than a chat room may be used. For example, a message board may be used instead of a chat room. In another example, a video chat or teleconference may be used between viewers that have the same hero or team of heroes. In another alternative embodiment, a viewer may be able to select other particular viewers to only chat, message, or video chat. The viewer may be able to locate another viewer to privately chat with through the more public chat room discussed regarding FIG. 6, as one example. Viewers may also be able to initiate private chats with multiple viewers. The viewers may or may not have selected the same hero or team of heroes.

FIG. 7 is a flow diagram illustrating a method 700 for monitoring chat messages from viewer electronic devices in accordance with an illustrative embodiment. In alternative embodiments, fewer, additional, and/or different operations may be performed. Also, the use of a flow diagram is not meant to be limiting with respect to the order of operations performed. In an operation 705, a plurality of chat messages from a plurality of viewer electronic devices are received. In an operation 710, the chat messages are monitored for keywords, trends, hashtags, etc. For example, a show may be in the middle of a puzzle competition where participants must choose to open one of three boxes, labeled box A, box B, and box C. The viewers of the show may be chatting about the show and talking about which box they think the participant should choose. The system can monitor how much each box is being talked about and also determine which box is being talked about the most. The system may also monitor not only mentions of each box, but whether the mention is favorable or not. For example, if a chat message says that "Barney should definitely not pick box B I think there is poison inside," a system may record a negative response toward box B. In this embodiment, only chat messages from viewers that have selected Barney as a hero are considered by the system. In other embodiments, other viewers' opinions may be considered if their hero is on Barney's team. In another embodiment, all viewers' opinions may be considered by the system.

In another embodiment, the system may pay particular attention to a hashtag, that is a sequence of numbers and letters set of by a pound (#) sign. For example, if a significant numbers of people sent a chat message that included #boxb, the system would recognized increased mentions of box B. In an alternative embodiment, instead of monitoring chat messages, a method may present voting options to viewers and receive votes from viewers that indicate their preference. Using the previous example, viewers may be able to vote on which box a participant should open. In other embodiments, the chat messages from viewers or the challenges facing participants may be more complex. For example, a participant may wonder whether to talk to another participant they have never spoken with before. Viewers may express their opinions on whether to talk to another participant, and if they believe the participants should converse, may discuss what should be spoken about. Similar to the above example, opinions of the viewers may be tracked and monitored, either through voting or through automatically monitoring the content of chat messages.

In an operation 715, the monitored chats are used to determine an instruction for the participant. Using the above example, if it is determined that the most viewers believe box B should be opened, an instruction is determined that the participant that they should open box B. In an operation 720, the instruction is sent to the participant that is wearing an earbud headphone. In this way, only the participant can hear the instruction dictated to it by his or her viewers. In this embodiment, the participant must open box B as dictated by the participant's viewers. In another embodiment, the participant may choose whether or not to follow the instruction of its viewers.

In an alternative embodiment, instead of using the method 700 to determine an instruction for a participant, method 700 may be utilized to determine a command for an aspect of the filmmaking set. For example, if many people are sending chat messages that the lights in a particular room should be turned off, the system will recognize that sentiment similar to operation 710. The system may then form a command to turn off those lights, similar to operation 715. Finally, the system may send a command that actually turns off the lights, similar to operation 720.

Figure 8:
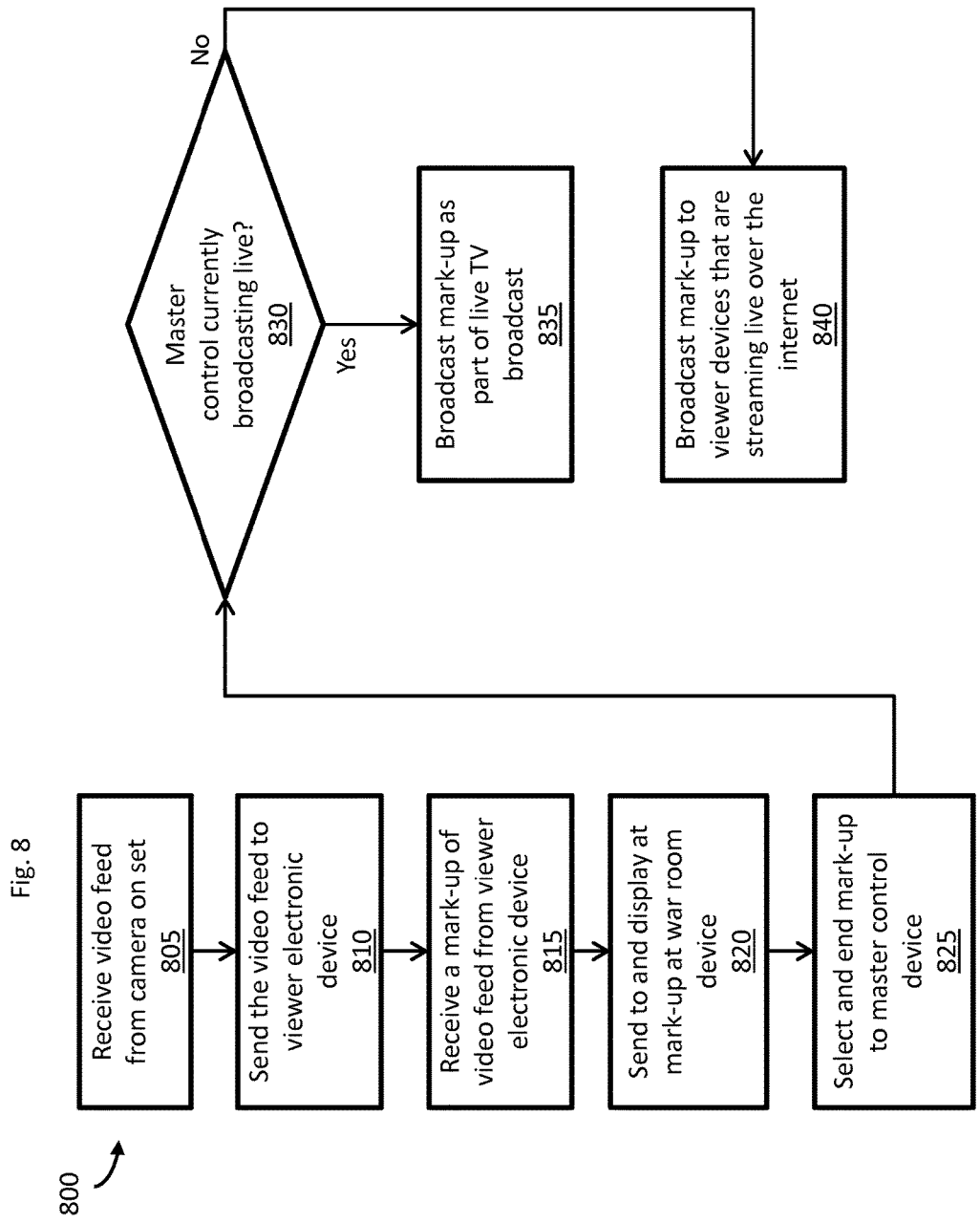
FIG. 8 is a flow diagram illustrating a method for receiving a mark-up from a viewer electronic device in accordance with an illustrative embodiment.

FIG. 8 is a flow diagram illustrating a method 800 for receiving a mark-up from a viewer electronic device in accordance with an illustrative embodiment. In alternative embodiments, fewer, additional, and/or different operations may be performed. Also, the use of a flow diagram is not meant to be limiting with respect to the order of operations performed. In an operation 805, a video feed is received from a camera on a filmmaking set. In an operation 810, the video feed is sent to a viewer electronic device. In an operation 815, a mark-up of the video feed is received from the viewer electronic device. The mark-up is a drawing onto the video feed. In alternative embodiments, the mark-up may be a text, an annotation, a graphic overlaid on the video feed, a hyperlink, a graphics interchange format (GIF) object, or a hashtag. In an operation 820, the mark-up is sent to and displayed at a war room device. In an operation 825, the mark-up is selected at the war room device and sent to the master control device. In an alternative embodiment, the mark-up is not selected and sent to the master control device. In another alternative embodiment, the mark-up is selected and sent only to other viewer electronic devices and not the master control device. In some embodiments, the mark-up is only sent to viewer electronic devices that have the same hero selected or have heroes selected that are on the same team.

In an operation 830, it is determined whether the master control device is currently broadcasting a show live. If the master control device is broadcasting the show live, then the master control device incorporates the mark-up in the live show broadcast in an operation 835. That is, a viewer watching the show on television can see the mark-up made by a viewer electronic device. If it is determined that the master control device is not broadcasting live at operation 830, then the mark-up is broadcast to other viewer electronic devices that are accessing content related to the show on the internet in an operation 840.

In alternative embodiments, other decisions may be made to determine where and how a mark-up is used. For example, the war room device may receive many mark-ups from a plurality of viewer electronic devices. The war room device may then automatically, or based on an input from a war room operator, select one or several mark-ups to send along to the master control device. The selected mark-up or mark-ups would be a subset of all the mark-ups received at the war room device. Upon receiving the mark-up or mark-ups at the master control device, the master control device or an operator of the master control device may decide whether to select a mark-up or mark-ups for inclusion in the live broadcast. In other embodiments, mark-ups may be incorporated into a non-live broadcast, or a delayed live broadcast. In another embodiment, a mark-up may be incorporated into a broadcast and sent to other viewer electronic devices. A war room device may also post certain mark-ups on message boards, blog web sites, news web sites, chat rooms, or the like.

Figure 9:
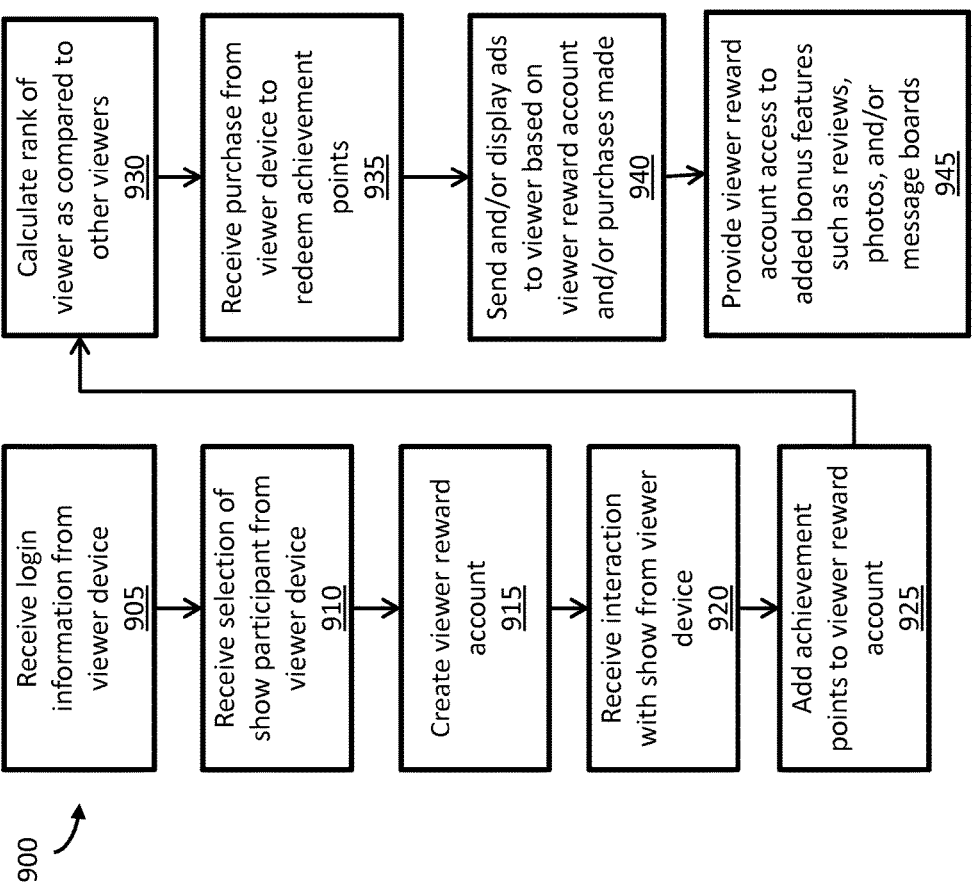
FIG. 9 is a flow diagram illustrating a method for earning achievement points for a viewer reward account in accordance with an illustrative embodiment.

FIG. 9 is a flow diagram illustrating a method 900 for earning achievement points for a viewer reward account in accordance with an illustrative embodiment. In alternative embodiments, fewer, additional, and/or different operations may be performed. Also, the use of a flow diagram is not meant to be limiting with respect to the order of operations performed. In an operation 905, login information is received from a viewer electronic device. In some embodiments, a viewer may have access to more or different content or features upon logging in. In an operation 910 selection of a show participant is received from the viewer electronic device. That is, a viewer chooses a participant in the show as their hero. A fan may choose the hero based on a certain affinity for the participant. For example, many viewers may select a participant that is close to the viewer in age, is physically attractive, has a quirky personality, is funny, or exhibits antisocial behavior that a viewer finds entertaining. In an alternative embodiment, a viewer may instead select a hero team. That is, a viewer may follow a group of participants that compete on a show as a team rather than selecting only one participant. In another embodiment, a viewer may be able to select both a team and an individual participant. In the embodiment disclosed in FIG. 9, it is contemplated that a viewer must pick one hero and stay with them for the duration of a show. In another embodiment, a viewer may be able to change their hero selection at any time. In another embodiment, a viewer may be able to change their hero selection in between broadcasted episodes of the show. In another embodiment, a viewer may be able to change their hero selection whenever their previous hero has been kicked out of the show or lost the show.

In an operation 915, a viewer reward account is created for the viewer. In an alternative embodiment, the viewer may be prompted to indicate whether he or she would like to create a viewer reward account. Similarly, the viewer may be prompted to configure their viewer reward account. For example, the viewer may be prompted to select how they would like to be rewarded, for what they would like to be rewarded, and prompted to enter demographic information to establish a reward account.

In an operation 920, an interaction with the show is received from the viewer electronic device. Such an interaction may be any action or input received by a viewer electronic device or received from the viewer electronic device as described throughout this detailed description. For example, the action or input may be sending a command to an aspect of the filmmaking set, changing camera views from the filmmaking set, sending a chat message regarding the show, voting on a question posed by the show, making a purchase in on the show's website, clicking a link provided on the show's website, or other action or input disclosed herein.

In an operation 925, achievement points or reward points are added to a viewer reward account. For example, every time an interaction is received from a viewer electronic device, one (1) point may be added to a viewer reward account. In an alternative embodiment, any amount of points may be added to the viewer reward account as a result of the interaction. In another alternative embodiment, different amounts of points may be added to the reward account depending on an interaction type. For example, a viewer may get more reward points for making a purchase on the shows website than for sending a chat message. A viewer may also be rewarded for other things. For example, rewards may be granted based on time spent interacting or using the website of the show, total number of shows interacted with, times a viewer gives advice to a participant, times a viewer gives advice to a participant that the participant follows, times a viewer correctly picks the winning participant of a challenge on the show, times a viewer sees advertisements, or times a viewer interacts with advertisements.

In an operation 930, a rank of the viewer is calculated as compared to other viewers. In other words, a viewer is ranked according to the number of reward points they have accrued. In an alternative embodiment where viewers are allowed to spend or redeem reward points, the viewer may be ranked according to total reward points earned, regardless of whether the reward points have been previously consumed, redeemed, spent, etc. Thus, a viewer is not afraid to spend their reward points for fear that their viewer rank will lower. In another alternative embodiment, a viewer may achieve certain benchmarks that they are rewarded for. For example, once a viewer accrues one thousand (1,000) reward or achievement points, they may achieve a new title. The titles may be related to a theme of the TV show. For example, if the TV is boot camp themed, a viewer may be given military-like titles as promotions for reaching certain reward or achievement point benchmarks. Such titles could include private, lieutenant, sergeant, general, etc. Other titling schemes may be used in other embodiments. In another alternative embodiment, a distinction may be made between reward and achievement points. For example, reward points may be points given that can be redeemed for additional content, purchases, prioritizing a viewer when the wish to send a command to the filmmaking set, etc. In this embodiment, the achievement points may be used for other purposes, such as ranking the viewer and award them promotions based on benchmarks passed in total achievement points.

In an operation 935, a purchase is received from a viewer device to redeem award or achievement points. For example, the viewer may purchase additional content related to the show. This may also be referred to as unlocking additional content. The viewer may also purchase physical items to be mailed to a physical address. These physical items may be merchandise related or not related to the show. The viewer may also use accrued reward or achievement points to interact with the show better or more often. For example, a viewer may be able to redeem reward points to guarantee that they are selected to interact personally with a show participant. In another example, the viewer may be able to redeem points to guarantee that they are able to control an aspect of the filmmaking set. In another example, the viewer may be able to redeem points to guarantee that their interaction or show mark-up appears in the broadcast of the show sent out by a master control device. In another example, a viewer may be able to redeem points to move them up in a queue or schedule that has been determined to control an aspect of the filmmaking set or interact with a show participant.

In an operation 940, an advertisement is sent and/or displayed to a viewer electronic device based on their viewer reward account and/or purchase made with the viewer reward account. For example, demographic information that the viewer has input for the viewer reward account may be used to target advertisements to the viewer. Similarly, if the viewer has made certain purchases using their viewer reward account, that information may also be used to target advertisements to the viewer. In an alternative embodiment, other actions made by the viewer may be used to target advertisements, such as chat messages, commands to control aspects of the filmmaking set, or the selection of the viewer's hero or hero team.

In an operation 945, the viewer is provided with additional bonus features by virtue of their having and using a viewer reward account. For example, certain parts of the show or website may only be accessible if the viewer has a viewer reward account. For example, a viewer may only have 24 hour access to viewing cameras on the filmmaking set if they have a viewer reward account. In another embodiment, a viewer without a reward account may have 24 hour access to viewing cameras on the filmmaking set, but may only get to send commands to control aspects of the filmmaking set if they have a viewer reward account. In another embodiment, a viewer may only be allowed to interact with a participant if they have a viewer reward account. Other additional content that may be made available to a viewer with a reward account may include additional reviews or reactions on shows or participants; additional photos from the show, filmmaking set, and viewers; access to additional message boards, chat rooms, and video chats with other viewers.

Figure 10:
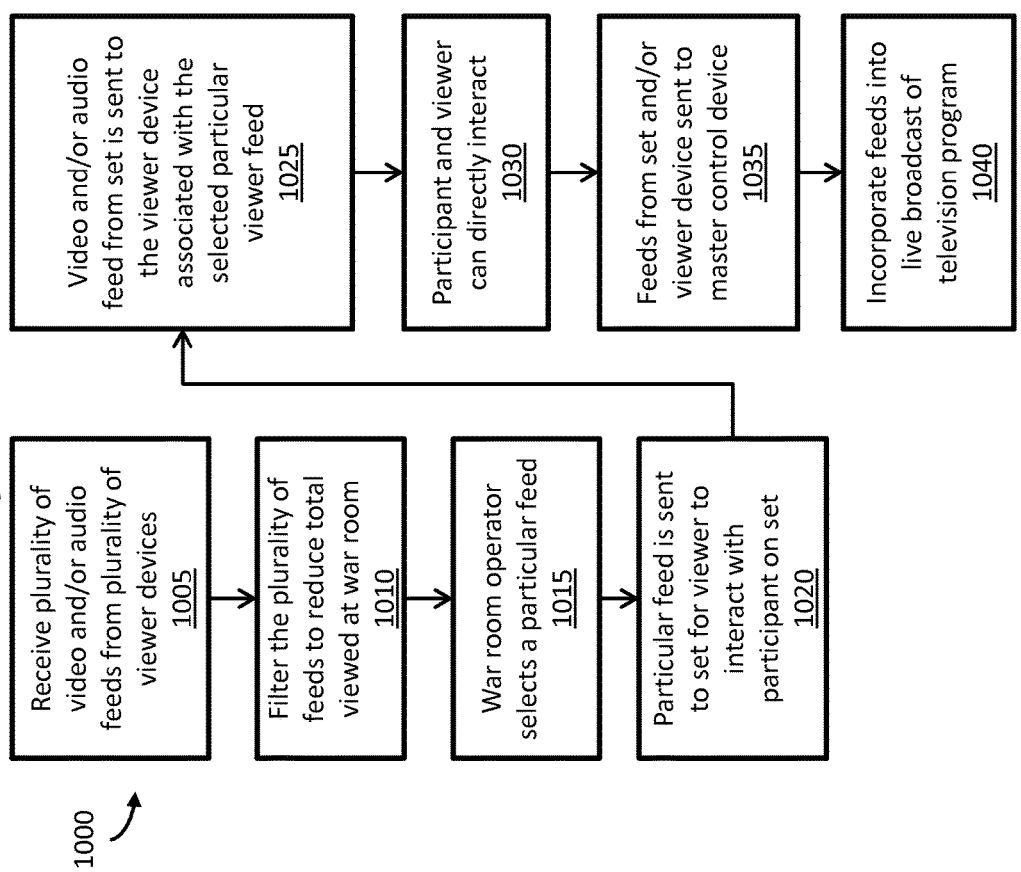
FIG. 10 is a flow diagram illustrating a method for incorporating feeds from a viewer electronic device into a broadcast in accordance with an illustrative embodiment.

FIG. 10 is a flow diagram illustrating a method 1000 for incorporating feeds from a viewer electronic device into a broadcast in accordance with an illustrative embodiment. In alternative embodiments, fewer, additional, and/or different operations may be performed. Also, the use of a flow diagram is not meant to be limiting with respect to the order of operations performed. In an operation 1005, a plurality of video and/or audio feeds is received from a plurality of viewer electronic devices. In an operation 1010, the plurality of video and/or audio feeds are filtered to reduce a total of the plurality of video and/or audio feeds that are viewed and listened to at a war room device. At certain times, the number of viewers that want to input video and/or audio interactions with the show may be too great to actually accommodate in the show. Accordingly, the number of feeds may be automatically filtered or otherwise scaled down from their total number. For example, the internet protocol (IP) address of viewer electronic devices may be used to filter down the number of feeds. For example, if an IP address has already had an interaction directly with the show, it may be filtered out. In another example, the system may be able to determine where geographically a viewer device is located. In this way, the system may be able to select only a certain number of feeds from a particular state, zip code, city, etc. so as to have a variety of feeds from a variety of locations selected. The filtering may also be random. The filtering may also be according to a viewer profile. The profile could be, for example, the reward profile discussed above with respect to FIG. 9 above. In this embodiment, the system may be configured to filter out viewers that have a certain demographic, or similarly may be configured to filter in viewers that have a certain demographic. In another example, the system may filter out viewers who do not have as many reward or achievement points in their reward account. In another embodiment, the filtering may be done manually by staffers in a war room. In another embodiment, the filtering may be performed automatically by the war room device. In another embodiment, the filtering may have rules that determine how to filter, and those rules may be updated or changed by war room staff or a war room operator. In another embodiment, the automatic filtering rules may be on a schedule, so that there is a predetermined sequence of rules applied determined by a particular time of day or a predetermined duration of time for each rule.

In an operation 1015, a war room operator selects a particular feed from the filtered feeds. In an alternative embodiment, a war room may have an operator and several war room staffers. In this embodiment, the war room staffers may select a subset of the filtered feeds for presentation to the war room operator, who then selects among the subset.

In an operation 1020, the feed selected by the war room operator is sent to the filmmaking set to enable the viewer of the selected feed to interact with a participant on the filmmaking set. In an alternative embodiment, the feed may be selected by an operator of a master control device. In another embodiment, the feed may be selected by the participant on the filmmaking set. In another alternative embodiment, the feed may be selected automatically by the war room device according to rules similar to the filtering rules discussed above with respect to operation 1010 of FIG. 10.

In an operation 1025, a video and/or audio feed from the filmmaking set is sent to the viewer electronic device associated with the selected video and/or audio feed. That is, when a viewer has been selected to interact with a participant on the filmmaking set through audio and/or video, audio and/or video of the participant is also sent back to the viewer to allow verbal and/or nonverbal communication. In an alternative embodiment, instead of or in addition to audio and/or video, the participant and the viewer may communicate through electronic text message communication, such as SMS, chat, instant messaging, message board, or other real time text communication.

In an operation 1030, the viewer and the participant can directly interact. The participant and the viewer can talk to each other and see each other. In an alternative embodiment, the viewer may be able to talk to the participant and see the participant, while the participant can only hear the viewer and not see the viewer. Other combinations of video, audio, and text messaging capabilities for both the participant and viewer are contemplated. For example, in one embodiment, the participant may not be able to communicate with the viewer at all, and may only receive audio from the viewer. In another embodiment, the participant may be able to see the video of the viewer on a portable electronic device or wearable electronic device.

In an operation 1035, the selected viewer feed and the feeds from the participant on the filmmaking set are sent to a master control device. In an operation 1040, the feeds from participant and/or the viewer can be incorporated into a broadcasted show. The feeds may be automatically incorporated or edited into the show, or an operator of the master control device may decide whether to incorporate the feeds. In another embodiment, the operator of the master control device may select certain feeds to incorporate and not others. For example, the operator may only select the audio feed from the viewer electronic device while selecting both a video and audio feed from the filmmaking set to incorporate into the broadcast.

Figure 11:
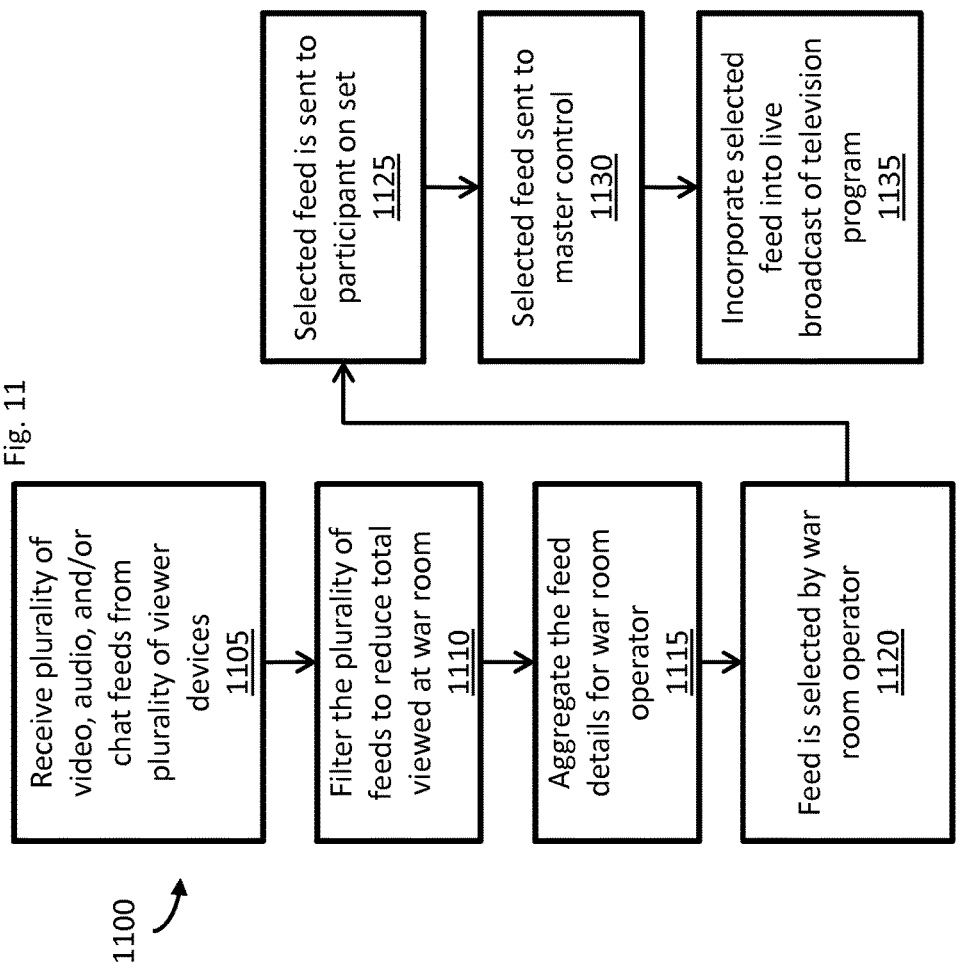
FIG. 11 is a flow diagram illustrating a method for selecting a feed from a viewer electronic device for incorporation into a broadcast in accordance with an illustrative embodiment.

FIG. 11 is a flow diagram illustrating a method 1100 for selecting a feed from a viewer electronic device for incorporation into a broadcast in accordance with an illustrative embodiment. In alternative embodiments, fewer, additional, and/or different operations may be performed. Also, the use of a flow diagram is not meant to be limiting with respect to the order of operations performed. In an operation 1105, a plurality of video, audio, and/or chat message feeds are received from a plurality of viewer electronic devices. In an operation 1110, the feeds are filtered to reduce a total number of feeds filtered and/or viewed at a war room electronic device. This filtering may be similar to the filtering in the operation 1010 discussed above with respect to FIG. 10.

In an operation 1115, details of the feeds are aggregated for an operator of the war room electronic device. The aggregating determines certain words, themes, trends, subject matters, votes, hashtags, photos, emotions, etc. that exist in the feeds and accumulates data regarding those feeds. For example, this aggregating may use similar techniques as the monitoring of operation 710 discussed above with respect to FIG. 7. In other embodiments, the aggregating may be capable of video recognition, such as facial recognition, to determine who is video chatting about the show. In another embodiment, the system may use speech to text capabilities to determine what viewers are talking about in regards to the show. In doing so, the system may be able to determine hot topics regarding the show, the will of the viewers regarding decisions that must be made by participants on the show, trends, and the most popular characters, games, items, or locations on the show. Additionally, the aggregated details of the feeds are presented to a war room operator. In one embodiment, a war room operator receives aggregated details regarding all participants, rooms, locations, teams, etc. from the show. In an alternative embodiment, the war room operator receives only aggregated details that are related to a participant, room, location, team, etc. that is associated with that particular war room.

In an operation 1120, a feed is selected by the war room operator. In an operation 1125, the selected feed is sent to the participant on the filmmaking set. The feed may be selected by the war room operator and sent to the participant on the filmmaking set in a manner similar to operations 1015 and 1020 discussed above with respect to FIG. 10. In an alternative embodiment, the war room operator does not send the selected feed to the participant on the filmmaking set. Instead, the operator may read about an aggregated trend or opinion, for example, from the war room electronic device, and relay the specific trend or opinion to the participant via an audio or text feed from the war room operator. In a similar embodiment, the specific trend or opinion may not be relayed to the participant, but the war room operator may summarize, abridge, or otherwise modify the trend or opinion for sending to the participant on the filmmaking set.

In an operation 1130, the selected feed is sent to a master control device. In an operation 1135, the selected feed is incorporated into live broadcast of the television program. The sending and incorporating of operations 1130 and 1135 may occur in a similar manner to operations 1035 and 1040 as discussed above with respect to FIG. 10. In an alternative embodiment where an aggregated detail is summarized, abridged, or otherwise modified by a war room operator before relaying it to the participant, that modified message sent to the participant from the war room operator may be sent to the master control device and incorporated into a broadcast of the television program.

Figure 12:
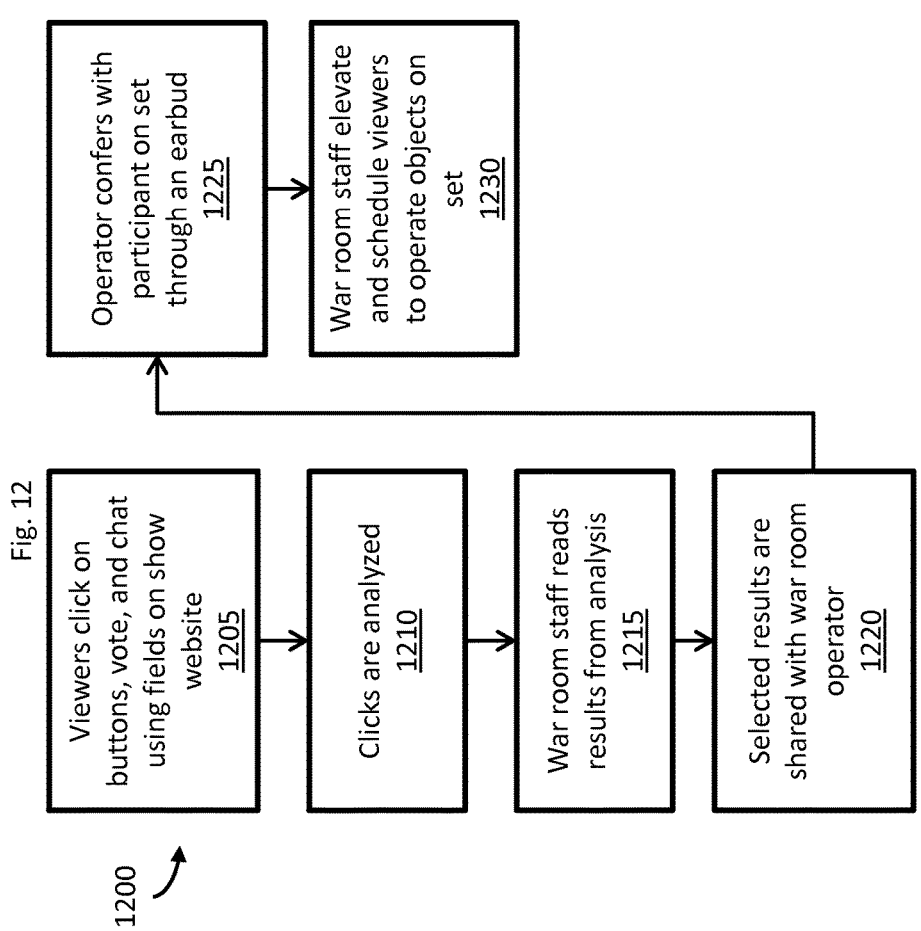
FIG. 12 is a flow diagram illustrating a method for elevating viewer electronic devices to control aspects of a filmmaking set in accordance with an illustrative embodiment.

FIG. 12 is a flow diagram illustrating a method 1200 for elevating viewer electronic devices to control aspects of a filmmaking set in accordance with an illustrative embodiment. In alternative embodiments, fewer, additional, and/or different operations may be performed. Also, the use of a flow diagram is not meant to be limiting with respect to the order of operations performed.

In an operation 1205, viewers click on buttons, vote, and chat using fields provided on a show website. For example, a viewer may select a room on a map that represents the filmmaking set. Clicking on the room may pull up a camera view of the room. In another example, viewers may be presented with a question to vote on. For example, if a participant has been granted a one-time immunity from expulsion from the show to use during a participant challenge, viewers may get to vote on whether they think the participant should exercise their immunity for a given participant challenge. In another example, a viewer may click on particular content related to the show, chat about the show, redeem reward points, make a purchase through the show's website, add a friend through a social network facilitated by the show, create or join an interest group through a social network facilitated by or linked to on the show's website, or otherwise interact with the show's website. In another embodiment, the amount of time spent on certain web pages or interacting with certain aspects of the show's website or filmmaking set may be tracked and recorded.

In an operation 1210, the clicks, votes, interactions, chats, time spent using a feature, etc. on the show's website are analyzed. For example, viewers may be spending more time viewing a particular room in a house on the filmmaking set than other rooms. In another example, it may be determined that more viewers vote on what a participant should eat for lunch than vote on whether a participant should use an immunity. In another example, it may be determined that more viewers chat when about a participant when they are wearing a particular outfit or have a particular hairstyle. In another example, it may be determined that more bobbleheads that are purported to emulate a participant are being sold more often than coloring books featuring images of the participant. In another embodiment, the system determines that more people want a participant to make one decision or choice in one way than another. For example, a system may determine that a majority of viewers would rather have the participant get a haircut than not get a haircut. In another example, the clicks may be requests to control aspects of the filmmaking set or control a particular aspect of the filmmaking set. Similarly, another embodiment may include clicks to control an aspect of the filmmaking set in a particular way. For example, viewer's may click to make a request that a door on the filmmaking set be opened, closed, or be placed somewhere in between the open and closed positions. In other alternative embodiments, the clicks and interactions are analyzed in a manner similar to that of operation 1010 discussed above with respect to FIG. 10.

In an operation 1215, a war room staffer reads results from the analysis of operation 1210. In an operation 1220, selected results read by the staffer are shared with the war room operator. In an alternative embodiment, a result is selected automatically by the war room electronic device according to rules or criteria predetermined by a war room operator or staffer.

In an operation 1225, a war room operator confers with a participant on the filmmaking set through an earbud speaker worn by the participant. The war room operator communicates the selected result or something related to the result. For example, if the result shows that viewers would like the participant to eat spaghetti, that message is passed on to the participant. In another example, if the selected result shows that viewers are particularly impressed with the athletic feats of the participant based on analysis of chat messages sent by viewers, the participant might be instructed to work out more to show off his or her feats of strength. In another example, the participant may have formed an alliance with another participant on the show, and the operator may select a result to communicate to the participant that indicates how well the alliance is perceived by viewers. In one embodiment, the participant may be required to follow an operator's advice or instruction. In another embodiment, the participant may choose what do with the operator's advice or instruction, that is whether to follow it or not.

In an operation 1230, a war room staffer elevates and schedules viewers to operate objects on the filmmaking set. In this embodiment, an elevated viewer can control an aspect of the filmmaking set live however they see fit. In another embodiment, a war room operator may elevate the viewer. Additionally, an elevated viewer may be able to talk to a participant. In one embodiment, the analyzed results may help a war room staffer or operator select which viewers to elevate to interact with set aspects or participants. For example, if a majority of viewers wish to see a particular door on the filmmaking set be opened, the war room operator may elevate one of the viewers that wishes to see the door opened so that viewer can control the door. In this way, a viewer can control an aspect of the set increasing interaction and the largest number of viewers' desires are satiated. In other embodiments, other criteria may be used to elevate a viewer to control aspects of the filmmaking set, many of which are disclosed herein. In another embodiment, a viewer may be elevated to control several aspects of the filmmaking set that are related. For example, the elevated viewer may be able to control cameras, doors, locks, windows, a stereo music system, lights, and a robotic roving vacuum cleaner that are all in or a part of the same room of a building on the filmmaking set. In one embodiment, such a stereo music system and a robotic roving vacuum cleaner may be combined into one device. In another embodiment, war room staffers or operators may schedule viewers to control aspects of the filmmaking set or interact with participants. In this way, a war room staffer or operator may not have to monitor every aspect of the filmmaking set all the time or elevate a viewer frequently. In this embodiment, viewers are scheduled to interact with participants or send commands to aspects of the filmmaking set.

Figure 13:
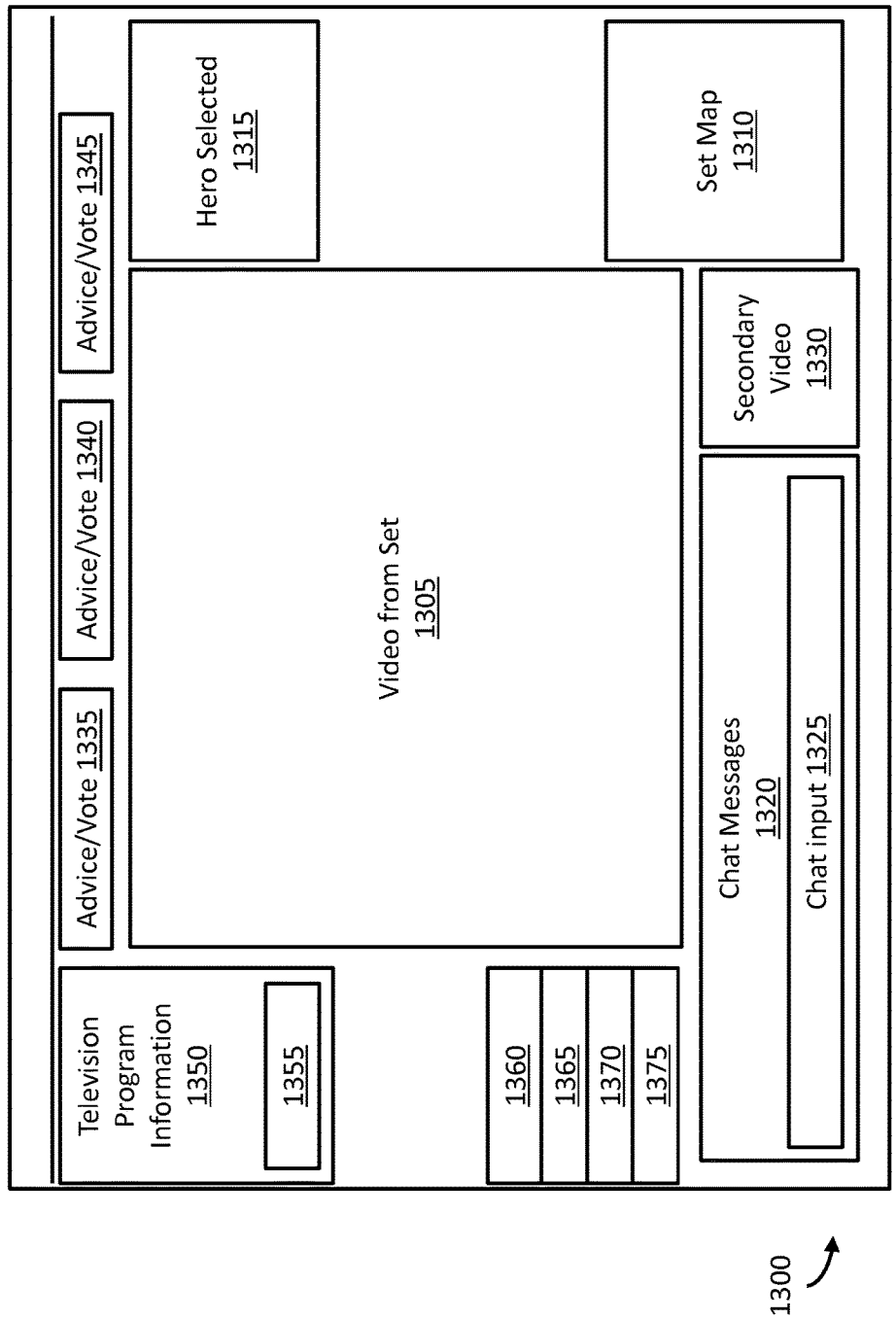
FIG. 13 is a figure representing a user interface that shows an interface for interacting with and viewing a filmmaking set in accordance with an illustrative embodiment.

FIG. 13 is a figure representing a user interface 1300 that shows an interface for interacting with and viewing a filmmaking set in accordance with an illustrative embodiment. In alternative embodiments, the features, placement, and layout of the user interface may be varied. The use of such an interface is not meant to be limiting of what a user interface may look like or functions that may be available in a user interface. The user interface 1300 shows an interface of a web page that can be accessed over the internet by a viewer of the show to interact with the show in many various ways, as described herein. The user interface 1300 includes a video from set 1305. The video from set 1305 shows the view of whatever camera from the filmmaking set the viewer has selected. In an alternative embodiment, the viewer may select an option to display the currently broadcasting show in the space shown as the video from set 1305. In alternative embodiments, multiple camera video feeds may be shown on the interface 1300, and the viewer may be able to configure which ones to show, or the web page may show all cameras from the filmmaking set. In the embodiment where interface 1300 shows all cameras, the viewer may be able to select a camera view in order to enlarge it.

The user interface 1300 also shows a set map 1310. The set map 1310 shows a map of the filmmaking set. In one embodiment, the filmmaking set may be a building. In that embodiment, the set map 1310 may show a floorplan of the building. The set map 1310 may also have selectable maps. For example, if the building has multiple floors, the viewer may be able to change set map views to show one floorplan of the building at a time. Similarly, the filmmaking set may have multiple buildings and/or outdoor areas. The viewer may be able to select different areas or buildings to be shown in the map. The viewer may also be able to select parts of the map to see in the video from set 1305. For example, the set map 1310 may show the first floor of a house that has a living room, kitchen, dining room, and bathroom on the first floor. The viewer may be able to select the living room shown on the set map 1310 in order to display a camera view of the living room in the video from set 1305. In another embodiment, on room may have multiple cameras, and therefore the map may include symbols that show where each camera in a room is and/or where it is facing. In this way a viewer can pick a particular camera they would like to see the feed from. In other embodiments, the map may also show symbols that represent other aspects of the filmmaking set that can be controlled. For example, the map may show all doors on a house that can be automatically opened or closed. The viewer may be able to select one of the aspects by clicking on it on the set map 1310. In another embodiment, clicking on a symbol on the set map 1310 will send a request to a war room device that the viewer would like to control the aspect of the set. Then the war room device or war room operators can determine whether the viewer will be elevated to control the aspect or if the viewer should be scheduled to control the aspect. In an alternative embodiment, the set map 1310 may also show the location of show participants. For example, if a participant is in the kitchen, a symbol representing the participant may be displayed on the set map 1310 in the area where the kitchen is portrayed on the set map 1310. In addition, the symbols for participants or aspects of the filmmaking set may also denote certain properties. For example, a participant may be shown as a small human body or human face. In one embodiment, each participant will have a different symbol shown on the set map 1310 so that a viewer looking at the set map 1310 can easily see where multiple participants are on the filmmaking set. In another example, a controllable door on the filmmaking set may be shown as a small door symbol on the set map 1310.

The user interface 1300 also shows a hero selected 1315. The hero selected 1315 may show what hero a viewer has selected. The hero selected 1315 may show a picture of the hero, a name of the hero, statistics about the hero such as performance on the show or vitals like height and weight. In an additional embodiment, the hero selected 1315 may also include a viewer input button that allows a viewer to change their hero to a different participant on the show. Such a selection could be a drop down menu, or may lead to another web page that is specifically designed to facilitate hero selection. In an alternative embodiment, the hero selected

1315 may display a continuous stream of a video feed that follows the hero participant wherever they go on the filmmaking set.

The user interface 1300 also shows a chat messages 1320. The chat messages 1320 displays a chat conversation between viewers. It will show chat messages from the viewer using the webpage and other viewers. In this embodiment, it shows chat messages from all viewers following a particular hero participant. In alternative embodiments, other chat messages may be displayed. For example, it may display chat messages from all viewers. The chat messages 1320 may display only chat messages from other viewers that the viewer using the web page is friends with through a social network. The chat messages 1320 may alternatively display only chat messages from other viewers that are friends with the viewer using the web page and have selected the same hero participant. In another embodiment, the chat messages 1320 may display chat messages from viewers who have joined the same interest group facilitated by the web site. For example, viewers may join a group of fans of the show from a particular city, region, neighborhood, state, province, country, continent, or locale. In another example, viewers may join a group that shares a common affinity for a sports team, type of food, type of car/truck, or particular television show.

The user interface 1300 also shows a chat input 1325. In this space, viewers may input chat messages that are seen by those who follow the same hero, or some other criteria as described above with respect to the chat messages 1320. The viewer may input text, numbers, links, hashtags, pictures, thumbnails, videos, screenshots of the show, etc. The viewer may input the chat messages into their viewer electronic devices using a mouse, keyboard, speech to text and a microphone, or other interface.

The user interface 1300 also shows a secondary video 1330. The secondary video may be a friend, connection, acquaintance, etc. of the viewer. For example, if two viewers are following the same hero and would like to video chat regarding the show or anything else, a video feed from the other viewer may appear at the secondary video 1330. In an alternative embodiment, videos, photos, or GIFs selected or received through chat messages may also be displayed at the secondary video 1330. In another alternative embodiment, the secondary video 1330 may show the view of a camera of the viewer electronic device. In this way, if the viewer is video chatting with another viewer, a participant, a war room staffer or operator, or other person, the viewer will be able to see the video feed they are sending and know exactly what is in the view of their camera. In another embodiment, the secondary video 1330 may show a video feed from the filmmaking set. For example, if the viewer wants to keep an eye on a particular room for activity but does not want a video feed from that room to be the main video from set 1305, a secondary feed from the filmmaking set may be displayed in the secondary video 1330. In another embodiment, the secondary video 1330 may display a video feed dedicated to showing the viewer's selected hero at all times. In another embodiment, the secondary video 1330 may display a camera that shows what the hero would see. In other words, the hero may be wearing a portable camera that is designed to be able to record whatever the hero sees.

The user interface 1300 also shows advice/vote buttons 1335, 1340, and 1345. The advice/vote buttons 1335, 1340, and 1345 can be clicked on or otherwise selected by the viewer in order to input into the show. In other embodiments there may be any number of advice/vote buttons. For example, a war room or master control operator may pose a question to any viewers who are currently viewing the show online. The question may go to all active viewers, or may only be sent to a subset of viewers. The subset could be viewers who are following a particular hero or team, viewers who are part of a certain affinity or locale group, viewers who have reward accounts, viewers who are the most engaged in the show based on number of interactions with the show or web site, viewers of a certain demographic based on their profile, or other factors. For example, if a participant is shopping for a new razor to shave his beard, a war room operator may pose a question to all viewers that have the participant as a hero whether to buy an electric shaver, a disposable razor, or a straight edge razor blade. The choices can appear in the advice/vote buttons 1335, 1340, and 1345. In another embodiment, the operator may ask about particular brands of razors. This may offer opportunity for advertisers to pay money to have their products featured in the show and in viewer voting options. Furthermore, market studies of viewers may be approximated using voting in this manner. In other words, if a recommendation for a particular brand of razor for a participant is solicited, the recommendations will likely indicate a preference of razor brand of the viewers that vote on the question. This information could in turn be sold to razor companies so that they can learn more about their customers or potential customers. Similarly, the data may be used to market advertising space to companies. For example, if the viewers prefer one brand of razor, that brand could be approached and asked if they would like to expand on their brand with customers that are already engaged in their brand. In another embodiment, companies that do not have strong results in the voting may be approached with an opportunity to expand their market share through advertising on the show. In other embodiments, the advice/vote buttons 1335, 1340, and 1345 may be used by the viewers to indicate other things. For example the viewers may vote on which aspects of the filmmaking set to control and how. For example, a question may be posed to viewers that solicits feedback on whether a door should be opened or not. Options such as no, yes, or yes but only halfway may be presented. Viewers may then vote on their preference. The system may automatically send the command of the majority of viewer votes, or the results may be sent to a war room device, and an operator of the war room device determines whether to actually perform the action or not.

The user interface 1300 also shows a television program information 1350 and a friends button 1355. The television program information 1350 displays information regarding what show the viewer is watching or looking at content for. Such information could include the name of the program, name of actors or participants in the program, channel they can view the broadcast shown on, etc. The television program information 1350 also displays titles of other shows or movies that the viewer may switch to. Those shows are displayed but are not highlighted and only basic information (less information than the selected show) about the show is displayed. The viewer may be able to click on or otherwise select the other shows to activate a webpage for those shows. In another embodiment, those other shows may be available for selection through a drop down menu. The friends button 1355 includes functionality building and maintaining a friend list. The friend list may be maintained by the war room or master control device, or the friend list may be maintained and hosted by a third party social networking site that already has friend networking capabilities built into its functionality. A viewer may add, delete, look at profiles of, invite to chat, invite to a group, or invite a new friend to the show or web site. Other actions that are typical of an online connection as typical from other online social networking sites may also be incorporated into the web site.

The user interface 1300 also shows display/buttons 1360, 1365, 1370, and 1375. These are a series of displays and/or buttons that show various information and have various functionalities. For example, they may show information about a viewer's profile and allow a viewer to edit information about their profile. It may also include view my profile or edit my profile buttons. Other buttons that may be included are games, friends, groups, inventory, trade offers, screenshots, videos, guides, my workshop, my comment history. The games button may take a viewer to online games related or not related to the show. The games may be hosted on the web site or by a third party. The friends button may take a viewer to a list of their friends, where friends may be added, deleted, invited to groups, invited to chats, etc. The groups button may take the viewer to a web page that shows all the groups a viewer is a part of. The viewer may also be able to join groups, search for groups, invite others to groups, or navigate to specific group pages or group messages boards through the groups button. The inventory button may take the viewer to a page where they can view achievements or tasks completed, as well as online items collected. For example, a viewer may be rewarded with a virtual trophy if they interact with the show a certain number of times. This trophy may be viewable by clicking the inventory button. In another embodiment, a viewer may earn an interaction item, which would be the opportunity to interact with an aspect of the filmmaking set. The viewer may be able to see their interaction item in the inventory. Once it is used, it may no longer appear in the inventory. Items in the inventory may also be traded or sold in one illustrative embodiment. The trade offers button may lead to a page that displays current trade offers from other viewers, and may also facilitate new trade offers to be made by the viewer to other viewers. The screenshots button may take the viewer to a web page where screenshots of the website or the show the viewer has saved are stored. The videos button may take the viewer to a place where videos of the web page or the show the viewer has saved are stored. The guides button may take a viewer to pages that explain how the web page and interactions with the show operate and work. The my workshop button may take the viewer to a screen where the viewer can assemble and manage virtual items that they earn or win related to a show. For example, in a television show about building motorcycles, a viewer may accrue motorcycle parts for interacting with the show. The viewer can go the my workshop to assemble a virtual motorcycle out of the parts they have earned. The my comment history button may take the viewer to a page that shows all of the chats, messages, comments, etc. that the viewer has made. Such a page may also display the context the message was made in an have a link to the conversation. In this way, a viewer may be able to recall what they said and where. This may be helpful if, for example, a viewer recalls a favorable conversation with someone that the viewer would like to be friends with. By looking in their comment history, they may be able to locate the conversation and the person who it was with, and subsequently add that person as a friend through the website.

Figure 14:
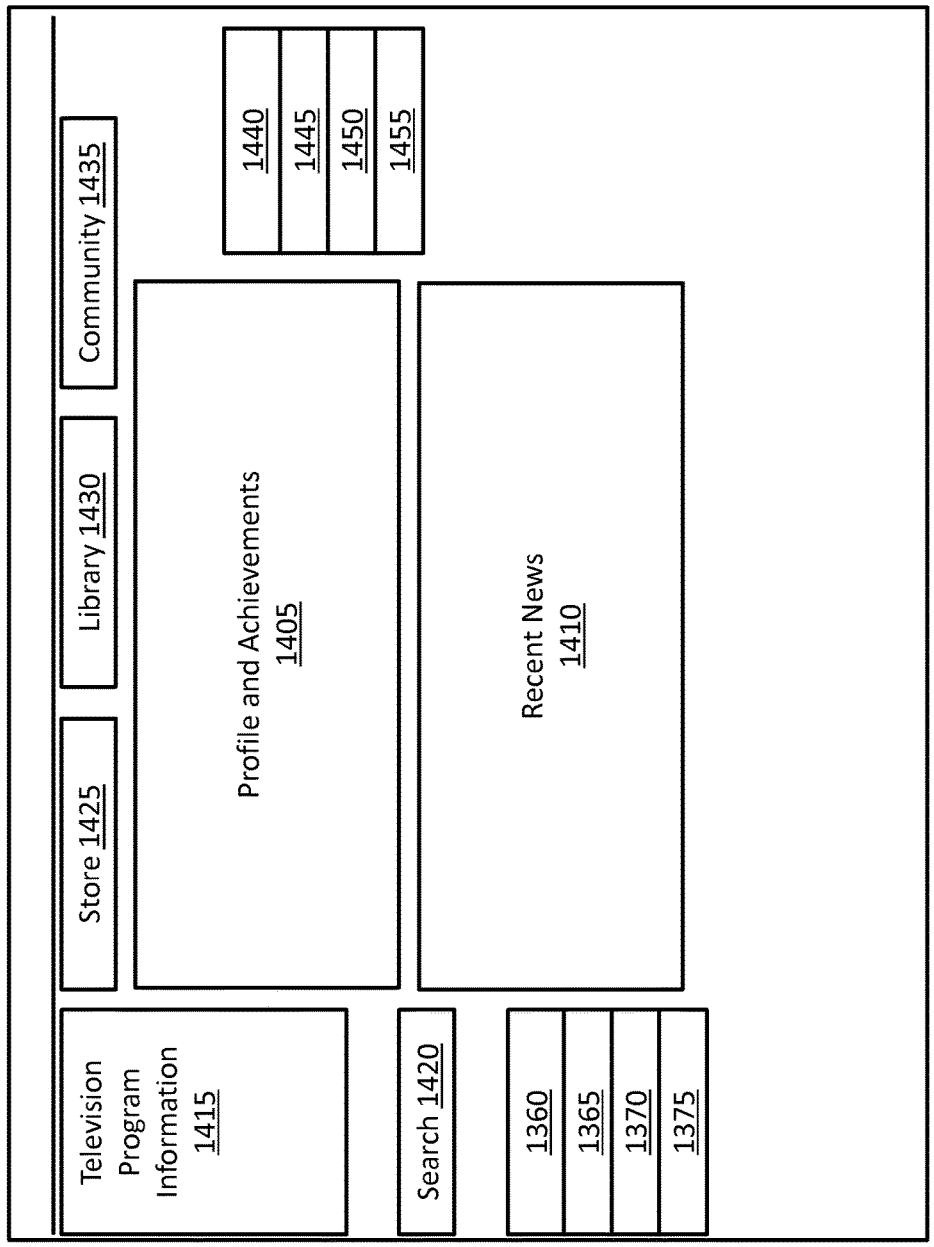
FIG. 14 is a figure representing a user interface that shows an interface for navigating features related to interacting with and viewing a filmmaking set in accordance with an illustrative embodiment.

FIG. 14 is a figure representing a user interface 1400 that shows an interface for navigating features related to interacting with and viewing a filmmaking set in accordance with an illustrative embodiment. In alternative embodiments, the features, placement, and layout of the user interface may be varied. The use of such an interface is not meant to be limiting of what a user interface may look like or functions that may be available in a user interface. The user interface 1400 shows a profile and achievements 1405. The profile and achievements 1405 may contain profile and achievement information for the viewer's account. It may also show recent changes to the account or recent achievements accomplished.

The user interface 1400 also shows a recent news 1410. The recent news 1410 may contain updates on the shows and any added functionalities to the available shows or the website interface. The recent news 1410 may also show updates related to the games or any other feature mentioned with respect to buttons/display 1360, 1365, 1370, and 1375 above with respect to FIG. 13. The recent news 1410 may also have advertisements. The advertisements may explicitly be advertisements, or may be tailored to some relation to the show. For example, referencing the shaving and razor example above discussed with respect to FIG. 13, if a viewer has voted on which razor a participant should buy, related ads may be shown in the recent news section 1410. For example, recent news 1410 may say "Get the razor used by Participant X on the Awesome Amazing Tug-of-War Show for 20% off today only in recognition of your role in helping Participant X look super clean cut!!!"

The user interface 1400 also shows a television program information 1415. The television program information 1415 may show similar information or have similar functionality to the television program 1350 discussed above with respect to FIG. 13. However, television program information 1415 may not display that a current TV show is selected, since the user interface 1400 is directed more toward content related to a viewers profile rather than content of a particular TV show.

The user interface 1400 also shows a search 1420. The search 1420 may receive an input or inputs from the viewer which allows the viewer to search for whatever they have input. This allows a user to search the web site for the search terms or related search terms. The search 1420 may also be programmed to search aspects of the web site that may have content unique to the viewer, such as the viewer's achievements, reward account, purchase history, comment, history, workshop, etc.

The user interface 1400 also shows social, community, and discussion button/displays 1440, 1445, 1450, and 1455. The social, community, and discussion button/displays 1440, 1445, 1450, and 1455 link to functions related to the social aspect of the web site. The social, community, and discussion button/displays 1440, 1445, 1450, and 1455 may include buttons such as community hub, achievements, forums, related groups, purchase history, store page, community guides, and support. The community page may take the viewer to a web page that allows the user to see the most popular groups, shows, participants, etc. and follow news and trends related to the shows and activity related to the web site. The achievements button may take the user to a page where his/hers achievements can be viewed as well as other viewers' achievements. The forums button may take the viewer to discussion message boards and/or chat rooms where general or topic specific discussion may occur between viewers. The related groups button may take the viewer to a page where the viewer can view groups that are related to the viewer's demographics, past purchases or redemptions, past interactions or commands within a show, hero choices, past communications through chat messages or discussion forums, or demographic information from a viewer's profile or rewards account. The purchase history may take the viewer to a page that shows all of the past purchases of the viewer. The purchases may include physical or virtual items, and the items may have been purchased with valid, legal tender currency or with redeemable points or other currency earned within the context of the show website. The store page button may take the user to a web page where items can be bought with real currency or a redeemable currency issued by the website. The community guides button may take the viewer to pages that contain viewer generated content such as reviews, videos, screenshots, strategies, fan fiction, ideas for show challenges, etc. The support button may take the viewer to a page where technical support issues can be addressed. This may include live technical support, frequently asked technical support questions, live support from other viewers, reports previously posted by viewers on how to deal with particular problems, etc.

In addition to the embodiments already disclosed herein, other embodiments for remotely controlling aspects of a set are contemplated. For example, viewers may be able to use a website to remotely control a gaming site. In one embodiment, that gaming site may be a laser tag game. A viewer may be able to control items, props, bunkers, or laser guns within the game. The game may also have cameras installed throughout the facility that can be used and controlled similar to the cameras already disclosed herein.

In another illustrative embodiment, the concepts disclosed herein may be used for remote animal care. For example, someone may be able to remotely view, play with, feed, talk to, hear, and pet an animal.

In another illustrative embodiment, the concepts disclosed herein may be used for remote senior adult care. For example, the methods and systems disclosed herein may be used to open doors for a senior citizen, help them access medications and food, and communicate and interact with a senior citizen. This may be particularly valuable if the senior adult is a relative.

In another illustrative embodiment, the participants of the show may be fictional characters played by actors, but can still be controlled and/or influenced by viewers. That is, the show may still be un-scripted or semi-scripted. In one embodiment, the fictional characters played by the participants may be a character from an already popularized video game. In this instance, it may produce an effect to a viewer that they are playing a video game using a person in real life, as the viewer has the ability to control or influence the participants every move and action. Similarly, other viewers that control items on the set may function as the foils or villains of a real life video game hero.

FIG. 15 is a flow diagram illustrating a method for displaying an interactive user interface for a show in accordance with an illustrative embodiment. In alternative embodiments, fewer, additional, and/or different operations may be performed. Also, the use of a flow diagram is not meant to be limiting with respect to the order of operations performed. In an operation 1505, a request is received from a viewer electronic device for a show page. For example, a viewer may click a hyperlink or enter a web address or uniform resource identifier (URI) in order to request a show page. In an operation 1510, a load balancer passes the request from the viewer electronic device to a show page server.

In an operation 1515, the show page server receives the show page request from the viewer electronic device. In an operation 1520, the show page server requests the latest data from a database and/or databases. For example, the databases may include ad engines, updated live/dynamic changes from the show, or other content. In an operation 1525, as soon as the show page server has something from the database(s), it accumulates it into the show page. If additional data is received after the data has been accumulated into the show page, the additional data may also be accumulated into the show page. In an alternative embodiment, the show page may be accumulated after a certain threshold of data has been received by the show page server.

In an operation 1530, the show page server serves the show page to the viewer electronic device. In an operation 1535, the viewer takes in action. This action may be, for example, clicking on a button on the show page, answering a question or contest through the show page, typing a chat message, or the like. In an operation 1540, a javascript indicates the action on the show page. For example, the javascript may compare a guess or contest answer to an answer stored in a local cache an indicate on the show page a right answer, a wrong answer, a statistic, and/or merely indicate the viewers chosen answer. In another example, the javascript may animate a button clicked by the viewer. In another example, the javascript may echo a chat locally. In other words, if a viewer sends a chat message, that chat message can be automatically populated in a chat room field on the show page.

In an operation 1545, the action data is sent to the show page server through a load balancer. For example, that the click happened may be sent as a tally. In another example, chat messages are sent along with a request to update the latest chat message stream. In another example, an indication of the answer choice or guess may be sent. In an operation, 1550, the show page server sends the action to the appropriate database. That is, the action is sent for computing, storing, analyzing, etc. of data relating to actions. For example, an answer choice or guess or other click may be sent to a live compute server, while chat messages may be sent to a chat server. In an operation 1555, a compute server counts and analyzes the data relating to the actions. For example, the compute server may count total clicks in the show page, and determine how, when, and where those clicks occurred in the show page. In another example, chat messages may be analyzed.

In an operation 1560, the data from the actions are used to update the database(s). For example, if a chat message is the action, the chat message log may be updated. In this way the show page server will be ready to properly assemble a show page in the case of subsequent requests for a show page. In an operation 1560, the server assembles a new show page and accumulates new data from the database(s). In an alternative embodiment, the show page server may not assemble an entirely new page. For example, if a viewer already has a show page displayed, they may only be requesting a new show page component, such as a new stream from a different camera at the filmmaking set. In an operation 1565, the show page server returns the new show page to the viewer electronic device. In an alternative embodiment, the show page server returns only the new show page component.

FIG. 16 is a flow diagram illustrating a method for an authentication procedure for a viewer using a user interface for a show in accordance with an illustrative embodiment. In alternative embodiments, fewer, additional, and/or different operations may be performed. Also, the use of a flow diagram is not meant to be limiting with respect to the order of operations performed. In an operation 1605, a viewer registers for an account. This may occur through a website designed for setting up and registering an account. Here, the viewer may set up a user name, password, and a site key. A site key may be a picture or other identifier selected by the user that they will recognize upon returning to a web site. In an operation 1610, a viewer payment is directed to a transaction processing service. This may be apparent to a viewer because they will be directed to third party website to complete the transaction. In another embodiment, the viewer will not notice because the transaction will only be redirected to a transaction processing service to actually process the transfer of funds. In this embodiment, a viewer must pay a certain amount of money to set up an account with the show.

In an operation 1615, a viewer logs into the show's web site for the first time by entering a user name. The server providing the website then provides a site key to prove the web site in an operation 1620. In other words, the server sends the site key set up by the viewer in the account creation. When the viewer sees the site key that they set up, the viewer can be sure that the website they are using is legitimate and the web site that they are intending to use. Once the viewer sees the site key, the viewer inputs their password in an operation 1625. In an operation 1630, the viewer's user name and password are validated using an authentication server.

In an operation 1635, the authentication server provides security tokens to the viewer electronic device so that the viewer can access content in the future without having to reenter their password or other authentication information each time they would like to view another stream, for example. Further, the security tokens may be specific. For example, a token may be valid only for certain streams. In other words, a token may only allow a viewer to see or stream certain camera(s) from the filmmaking set. In another example, a token may be valid only for one episode of a television show. This may be useful if the episodes are sold to viewers individually. In another embodiment, the token may be valid for an entire season of the show, but not for other seasons of the show.

In an operation 1640, the viewer is presented with a contest and/or question. In an operation 1645, the viewer answers the contest and/or question and their response is sent to the server in an operation 1650. In this embodiment, the answer is sent with a token by the viewer's browser. In an operation 1655, the server can validate the token. This may be useful for verifying the identity and user of the answer or contest. In another embodiment where the viewer makes a purchase, a token can be used in a similar manner to verify the purchaser, their address, account for paying, etc. In another embodiment, a rewards account may be used, and so it may be worthwhile to verify the viewer before awarding them reward or achievement points. In an operation 1660, the viewer requests a new video through a universal resource identifier (URI) or other link, button, or navigational tool provided by the show web site. For example, a viewer may already be on the website, but may wish to stream a different camera from the filmmaking set. In an operation 1665, the new stream is sent to the viewer electronic device.

In an illustrative embodiment, any of the operations described herein can be implemented at least in part as computer-readable instructions stored on a computer-readable medium or memory. Upon execution of the computer-readable instructions by a processor, the computer-readable instructions can cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system comprising:
a memory; and
a processor coupled to the memory, wherein the processor is configured to:
receive a video feed from a camera, wherein the video feed comprises video from a filmmaking set for a television or internet broadcast show;
send the video feed to a plurality of viewer electronic devices, wherein the plurality of viewer electronic devices are physically remote from the filmmaking set;
receive a command to control an aspect of the filmmaking set from at least one of the plurality of viewer electronic devices, wherein the aspect of the filmmaking set comprises an object other than: the camera on the filmmaking set, a microphone on the filmmaking set, lighting of the filmmaking set, and controls associated with the camera, the microphone, or lighting of the filmmaking set;
receive one or more audio feeds from one or more microphones, wherein the one or more audio feeds comprises instructions to a participant in the television or internet broadcast show being filmed on the filmmaking set;
select a subset of instructions from the one or more audio feeds based on a frequency of the subset of instructions in the one or more audio feeds; and
send the command to the filmmaking set and the subset of instructions to a headset worn by the participant in the television or internet broadcast show being filmed on the filmmaking set, wherein a change to the aspect of the filmmaking set by the command and a change to an interaction of the participant with the aspect of the filmmaking set by the subset of instructions are incorporated into the video feed sent to the plurality of viewer electronic devices.

2. The system of claim 1, wherein the system further comprises a video display, and wherein the processor is further configured to:
display the video feed on the video display;
receive a viewer video feed from a camera of one of the plurality of viewer electronic devices; and
display the viewer video feed on the video display as a part of the television or internet broadcast show.

3. The system of claim 1, wherein the processor is further configured to:
receive a viewer video feed from a camera of one of the plurality of viewer electronic devices; and
send the viewer video feed to a video display at the filmmaking set.

4. The system of claim 1, wherein the command comprises an electronic signal that automatically controls the aspect of the filmmaking set, and further wherein the aspect is a door, a window, a lock, a thermostat, an appliance, an ice maker, a beverage dispenser, a fireplace, a curtain, a clock, a telephone, a doorbell, a cabinet, or a movable robot.

5. The system of claim 1, wherein the filmmaking set comprises a plurality of cameras and the camera is a first camera of the plurality of cameras, and wherein the processor is further configured to:

receive a selection of a second camera of the plurality of cameras from one of the plurality of viewer electronic devices;

receive, in response to receiving the selection, a second video feed from the second camera; and send, in response to receiving the selection, the second video feed.

6. The system of claim 1, wherein the processor is further configured to:

receive a plurality of messages, wherein a message of the plurality of messages is a text-based chat message, a video chat message, an audio message, or an indication of a vote; and analyze the content of the plurality of messages to determine the command to control the aspect of the filmmaking set, wherein the command is determined based at least in part on the content of the plurality of messages from the plurality of viewer electronic devices.

7. The system of claim 6, wherein the processor is further configured to:

receive a first participant selection from a first viewer electronic device of the plurality of viewer electronic devices to associate a first user account being used on the first viewer electronic device with a person on the filmmaking set, wherein the person is a participant or actor in a television program being filmed on the filmmaking set; and receive a second participant selection from a second viewer electronic device of the plurality of viewer electronic devices to associate a second user account being used on the second viewer electronic device with the person.

8. The system of claim 7, wherein the message is sent to other viewer electronic devices from which the second participant selection has been received.

9. The system of claim 6, wherein the content analyzed to determine the command comprises at least one of:

words of the text-based chat message;

object recognition of the video chat message;

counting of the indication of the vote; and speech recognition of the audio message.

10. The system of claim 9, wherein the content comprises a particular word, a particular phrase, a photo, a particular alphanumeric sequence, a hashtag, or a hyperlink.

11. The system of claim 10, wherein the processor is further configured to determine the command based on how many of the plurality of messages received from the plurality of viewer devices have similar content.

12. The system of claim 10, wherein the processor is further configured to:

determine an advice message based on the content; and send the advice message to a visual display at the filmmaking set.

13. The system of claim 10, wherein the processor is further configured to:

determine an advice message based on the content;

generate an audio signal of the advice message; and send the audio signal to a speaker at the filmmaking set.

14. The system of claim 1, wherein:

the processor is further configured to receive a mark-up of the video feed from one of the plurality of viewer electronic devices that is physically remote from the filmmaking set, the mark-up comprises a drawing, a text, an annotation, a graphic overlaid on the video feed, a hyperlink, a graphics interchange format (GIF) object, or a hashtag, and the mark-up is incorporated into the video feed sent to the plurality of viewer electronic devices.

15. A method comprising:

receiving, by a processor, a video feed from a camera, wherein the video feed comprises video from a filmmaking set for a television or internet broadcast show;

sending, by the processor, the video feed to a plurality of viewer electronic devices, wherein the viewer electronic devices are physically remote from the filmmaking set;

receiving, by the processor, a command to control an aspect of the filmmaking set from at least one of the viewer electronic devices, wherein the aspect of the filmmaking set comprises an object other than: the camera on the filmmaking set, a microphone on the filmmaking set, lighting of the filmmaking set, and controls associated with the camera, the microphone, or lighting of the filmmaking set;

receiving, by the processor, one or more audio feeds from one or more microphones, wherein the one or more audio feeds comprises instructions to a participant in the television or internet broadcast show being filmed on the filmmaking set;

selecting, by the processor, a subset of instructions from the one or more audio feeds based on a frequency of the subset of instructions in the one or more audio feeds; and sending, by the processor, the command to the filmmaking set and the subset of instructions to a headset worn by the participant in the television or internet broadcast show being filmed on the filmmaking set, wherein a change to the aspect of the filmmaking set by the command and a change to an interaction of the participant with the aspect of the filmmaking set by the subset of instructions are incorporated into the video feed sent to the plurality of viewer electronic devices.

16. A non-transitory computer readable medium having instructions stored thereon for execution by a processor, the instructions comprising:

instructions to receive, by the processor, a video feed from a camera, wherein the video feed comprises video from a filmmaking set for a television or internet broadcast show;

instructions to send, by the processor, the video feed to a plurality of viewer electronic devices, wherein the plurality of viewer electronic devices are physically remote from the filmmaking set;

instructions to receive, by the processor, a command to control an aspect of the filmmaking set from the at least one of plurality of viewer electronic devices, wherein the aspect of the filmmaking set comprises an object other than: the camera on the filmmaking set, a microphone on the filmmaking set, lighting of the filmmaking set, and controls associated with the camera, the microphone, or lighting of the filmmaking set;

instructions to receive, by the processor, one or more audio feeds from one or more microphones, wherein the one or more audio feeds comprises instructions to a participant in the television or internet broadcast show being filmed on the filmmaking set;

instructions to select, by the processor, a subset of instructions from the one or more audio feeds based on a frequency of the subset of instructions in the one or more audio feeds; and instructions to send, by the processor, the command to the filmmaking set and the subset of instructions to a headset worn by the participant in the television or internet broadcast show being filmed on the filmmaking set, wherein a change to the aspect of the filmmaking set by the command and a change to an interaction of the participant with the aspect of the filmmaking set by the subset of instructions are incorporated into the video feed sent to the plurality of viewer electronic devices.

17. The method of claim 15, wherein the plurality of viewer electronic devices are physically remote from each other.

18. The method of claim 16, wherein the plurality of viewer electronic devices are viewers of the television or internet broadcast show.

19. The method of claim 15, further comprising:

receiving, by the processor, viewer audio from one of the plurality of viewer electronic devices;

outputting, by the processor, the viewer audio such that it is heard by a person on the filmmaking set, wherein the person is a part of a television program being filmed on the filmmaking set;

receiving, by the processor, set audio from the filmmaking set that comprises a reaction of the person to the viewer audio;

sending, by the processor, the set audio to a viewer electronic device from which the viewer audio originated so that the person on the filmmaking set and a viewer associated with the viewer electronic device can have a conversation; and sending, by the processor, along with the video feed sent to the plurality of viewer electronic devices, the conversation comprising the set audio and the viewer audio to the plurality of viewer electronic devices.

* * * * *